United States Patent
Shimada et al.

(10) Patent No.: US 9,885,586 B2
(45) Date of Patent: Feb. 6, 2018

(54) PHYSICAL QUANTITY SENSOR

(71) Applicant: Panasonic Intellectual Property Management Co., Ltd., Osaka (JP)

(72) Inventors: Sho Shimada, Aichi (JP); Ryota Sudo, Fukui (JP); Hideyuki Murakami, Osaka (JP); Shinjiro Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 292 days.

(21) Appl. No.: 14/422,375

(22) PCT Filed: Aug. 21, 2013

(86) PCT No.: PCT/JP2013/004940
§ 371 (c)(1),
(2) Date: Feb. 19, 2015

(87) PCT Pub. No.: WO2014/030346
PCT Pub. Date: Feb. 27, 2014

(65) Prior Publication Data
US 2015/0204690 A1    Jul. 23, 2015

(30) Foreign Application Priority Data

Aug. 22, 2012  (JP) ................................ 2012-182910
Jun. 18, 2013  (JP) ................................ 2013-127262

(51) Int. Cl.
*G01C 25/00*     (2006.01)
*G01C 19/5776*   (2012.01)
(Continued)

(52) U.S. Cl.
CPC ....... *G01C 25/005* (2013.01); *G01C 19/5614* (2013.01); *G01C 19/5726* (2013.01);
(Continued)

(58) Field of Classification Search
CPC ..................................................... G01P 15/097
See application file for complete search history.

(56) References Cited

U.S. PATENT DOCUMENTS

2005/0147186 A1 *  7/2005  Funamoto ........... H04L 27/2605
                                                       375/324

FOREIGN PATENT DOCUMENTS

| JP | 05-018762 | 1/1993 |
|----|-----------|--------|
| JP | 08-114455 | 5/1996 |
| JP | 09-166438 | 6/1997 |

OTHER PUBLICATIONS

International Search Report dated Nov. 12, 2013 in International (PCT) Application No. PCT/JP2013/004940.

* cited by examiner

*Primary Examiner* — Yu-Hsi D Sun
(74) *Attorney, Agent, or Firm* — Wenderoth, Lind & Ponack, L.L.P.

(57) ABSTRACT

A physical quantity sensor includes a detection circuit that outputs a detection value indicating a physical quantity applied to a detecting element and a correction processor that corrects the detection value to output a corrected value. The correction processor causes the corrected value to be substantially 0 (zero) if all of conditions that an absolute value of a time-differentiated value of the detection value is not larger than a predetermined differential threshold and that an absolute value of the corrected value is not larger than a predetermined output threshold are satisfied. This physical quantity sensor prevents the output signal from changing due a temperature change in spite of a small number of components.

8 Claims, 13 Drawing Sheets

(51) Int. Cl.
*G01C 19/5726* (2012.01)
*G01P 15/08* (2006.01)
*G01P 15/097* (2006.01)
*G01P 21/00* (2006.01)
*G01C 19/5614* (2012.01)
*G01P 3/486* (2006.01)

(52) U.S. Cl.
CPC .......... *G01C 19/5776* (2013.01); *G01P 3/486* (2013.01); *G01P 15/0888* (2013.01); *G01P 15/097* (2013.01); *G01P 21/00* (2013.01)

Detecteion ValueS74

Output Signal S77

Corrected Value S89

Output Signal S80

PHYSICAL QUANTITY SENSOR

This application is a U.S. national stage application of the PCT international application No. PCT/20JP13/004940 filed on Aug. 21, 2013, which claims the benefit of foreign priority of Japanese patent applications 2012-182910 filed on Aug. 22, 2012 and 2013-127262 filed on Jun. 18, 2013, the contents of all of which are incorporated herein by reference.

TECHNICAL FIELD

The present invention relates to a physical quantity sensor to be used for an attitude control of movable bodies, such as airplanes and vehicles, or used in navigation systems for the movable bodies.

BACKGROUND ART

FIG. 12 is a perspective view of conventional physical quantity sensor 500 disclosed in PTL 1. Vibrator 1 is accommodated in housing 2. Temperature sensor 3 is accommodated in housing 2 for sensing a temperature around vibrator 1. Peltier element 4 is disposed on an upper surface of housing 2. Temperature controller 5 controls a direction and an amount of an electric current flowing through Peltier element 4 so that a temperature in housing 2 can be controlled at a constant level.

An operation of conventional physical quantity sensor 500 will be described below. Upon having an alternating-current (AC) voltage applied, vibrator 1 vibrates 1 in a direction of a Y-axis symmetrically. Vibrator 1 is rotated at an angular velocity ω about a Z-axis while vibrator 1 vibrates, and then, a Coriolis force is produced on vibrator 1. An electric charge generated on vibrator 1 due to the Coriolis force is converted into an output voltage to detect the angular velocity.

When an ambient temperature around physical amount sensor 500 changes, a change in the output signal due to the temperature change can be prevented by the following mechanism: the temperature in housing 2 is sensed with temperature sensor 3, the direction and the amount of the electric current applied to Peltier element 4 are controlled with temperature controller 5, thereby the temperature in housing 2 is controlled at a predetermined level. Conventional physical quantity sensor 500, however, includes a large number of components and has a large size accordingly.

CITATION LIST

Patent Literature

PTL 1: Japanese Patent Laid-Open Publication No. 05-18762

SUMMARY

A physical quantity sensor includes a detection circuit that outputs a detection value indicating a physical quantity applied to a detecting element and a correction processor that corrects the detection value to output a corrected value. The correction processor causes the corrected value to be substantially 0 (zero) if all of conditions that an absolute value of a time-differentiated value of the detection value is not larger than a predetermined differential threshold and that an absolute value of the corrected value is not larger than a predetermined output threshold are satisfied.

This physical quantity sensor prevents the output signal from changing due a temperature change in spite of a small number of components

DETAIL DESCRIPTION OF PREFERRED EMBODIMENTS

Exemplary Embodiment 1

Figure 1:
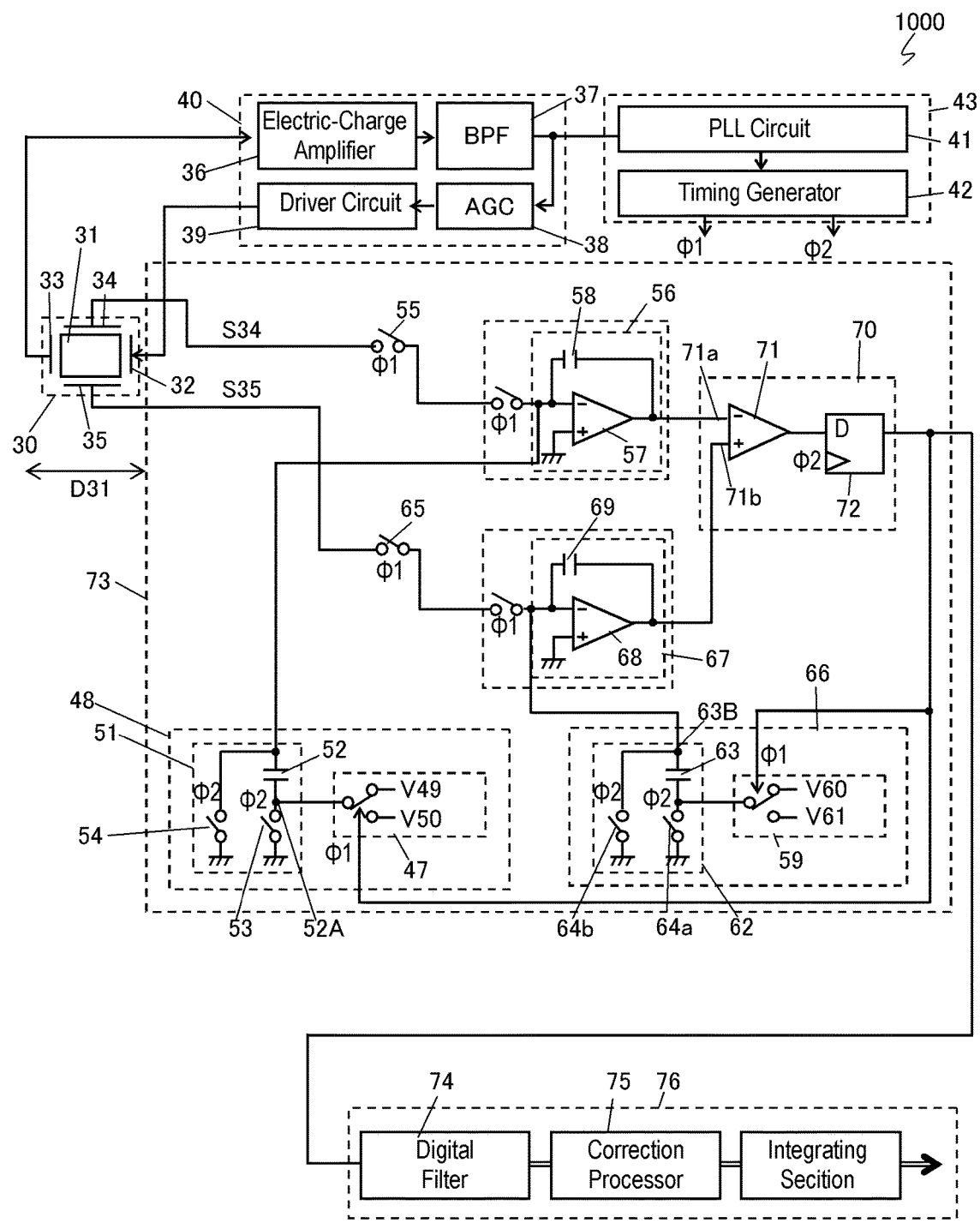
FIG. 1 is a circuit diagram of a physical quantity sensor in accordance with Exemplary Embodiment 1 of the present invention.

FIG. 1 is a circuit diagram of physical quantity sensor 1000 in accordance with Exemplary Embodiment 1 of the present invention. Detecting element 30 includes vibrating body 31 made of an vibrator, driving electrode 32 for causing vibrating body 31 to vibrate, monitor electrode 33 that generates an electric charge in response to the vibration of vibrating body 31, and sensing electrodes 34 and 35 that generate electric charges in response to an angular velocity applied to detecting element 30. Driving electrode 32 includes a piezoelectric body to cause vibrating body 31 to vibrate. Monitor electrode 33 includes a piezoelectric body that generates an electric charge in response to the vibration of vibrating body 31. Sensing electrodes 34 and 35 includes a piezoelectric body that generates an electric charge in response to an angular velocity applied to detecting element 30. Sensing electrodes 34 and 35 are configured to have polarities opposite to each other. Electric-charge amplifier 36 has the electric charge input thereto from monitor electrode 33 of detecting element 30, and converts the electric charge into a voltage at a predetermined gain. Band pass filter (BPF) 37 removes a noise component from a signal output from electric-charge amplifier 36 to output a monitor signal. Automatic gain control (AGC) circuit 38 includes a half-wave rectifying and smoothing circuit that generates a direct-current (DC) signal by half-wave rectifying and smoothing the signal output from BPF 37. AGC circuit 38 amplifies or attenuates and the monitor signal output from BPF 37 based on the DC signal, and outputs the resultant monitor signal. Driving circuit 39 receives the signal output from AGC circuit 38, and outputs a driving signal to driving electrode 32 of detecting element 30. Electric-charge amplifier 36, BPF 37, AGC circuit 38, and driving circuit 39 constitute driver circuit 40.

Phase locked loop (PLL) circuit 41 multiplies a frequency of the monitor signal output from BPF 37 of driver circuit 40, and integrates a phase noise temporally to reduce the phase noise, and then outputs a frequency-multiplied signal having a frequency obtained by multiplying the frequency of the monitor signal. Timing generator 42 generates and outputs a timing signal based on the frequency-multiplied signal output from PLL circuit 41. PLL circuit 41 and timing generator 42 constitute timing control circuit 43.

DA switch section 47 includes reference voltages 49 and 50 and a switch that switches reference voltages 49 and 50 in response to a predetermined signal to alternatively output the reference voltages. DA output section 51 includes capacitor 52 that receives an output signal from DA switch section 47 and switches 53 and 54 connected to both ends of capacitor 52. Switch 53 is connected between one end of capacitor 52 and a ground while switch 54 is connected between another end of capacitor 52 and the ground. Switches 53 and 54 are turned on and off in response to timing signal $\Phi 2$ for discharging an electric charge from capacitor 52. DA switch section 47 and DA output section 51 constitute DA converter 48. DA converter 48 discharges an electric charge from capacitor 52 in response to timing signal $\Phi 1$, and inputs and outputs the electric charge in response to the reference voltage output from DA switch section 47. Switch 55 outputs an output signal, an electric current, from sensing electrode 34 in response to timing signal $\Phi 1$. Integrating circuit 56 receives the electric current output from switch 55, and is formed of operational amplifier 57 and capacitor 58 connected between an output port and an inversed input port of operational amplifier 57.

DA switch section 59 includes reference voltages 60 and 61 and alternatively outputs reference voltages switched in response to a predetermined signal. DA output section 62 includes capacitor 63 that receives 64b the output signal from DA switch section 59 and switches 64a and 64b connected to both ends of capacitor 63. Switch 64a is connected between one end of capacitor 63 and the ground while switch 64b is connected to another end of capacitor 63 and the ground. Switches 64a and 64b are turned on and off in response to timing signal $\Phi 2$ for discharging an electric charge from capacitor 63. DA switch section 59 and DA output section 62 constitute DA converter 66. DA converter 66 discharges the electric charge from capacitor 63 in response to timing signal $\Phi 2$, and inputs and outputs the electric charge in response to the reference voltage output from DA switch section 59. Switch 65 outputs an output signal, an electric current, from sensing electrode 35 in response to timing signal $\Phi 1$. Integrating circuit 67 receives the signal output from switch 65, and includes operational amplifier 68 and capacitor 69 connected to an output port and an inversed input port of operational amplifier 68.

Comparison circuit 70 includes comparator 71 and D-type flip-flop 72. Comparator 71 compares the integrated signal output from integrating circuit 56 with the integrated signal output from integrating circuit 67. D-type flip-flop 72 receives a one-bit digital signal formed of one bit output from comparator 71. D-type flip-flop 72 latches the one-bit digital signal at a rising of timing signal $\Phi 1$ to output a latched signal. This latched signal is input to DA switch section 47 of DA converter 48 for switching reference voltages 49 and 50, and is input DA switch section 59 of DA converter 66 for switching reference voltages 60 and 61. DA converters 48 and 66, integrating circuits 56 and 67, and comparison circuit 70 constitute detection circuit 73 that functions as a $\Sigma\Delta$ modulator. Detection circuit 73 ($\Sigma\Delta$ modulator) $\Sigma\Delta$-modulates electric charges output from sensing electrodes 34 and 35 of detecting element 30, and converts the resultant electric charges into a one-bit digital signal to output the one-bit digital signal.

Digital filter 74 receives the one-bit digital signal output from detection circuit 73, and provides the signal with a filtering process for removing a noise component from the signal, then outputs the resultant one bit-digital signal to correction processor 75. Correction processor 75 receives the one-bit digital signal output from digital filter 74, and carries out a correction calculation of the one-bit digital signal with a predetermined correction value by a replacing process. For instance, in the case that the correction value is "5", upon having one-bit digital signals having values "0", "1", and "−1" input thereto, correction processor 75 replaces these values with one-bit digital signals having values "0", "5", and "−5" and outputs the signals having replaced values.

Digital filter 74 and correction processor 75 constitute calculation section 76. Timing control circuit 43, detection circuit 73 ($\Sigma\Delta$ modulator), and calculation section 76 constitute a sensing circuit.

Figure 2:
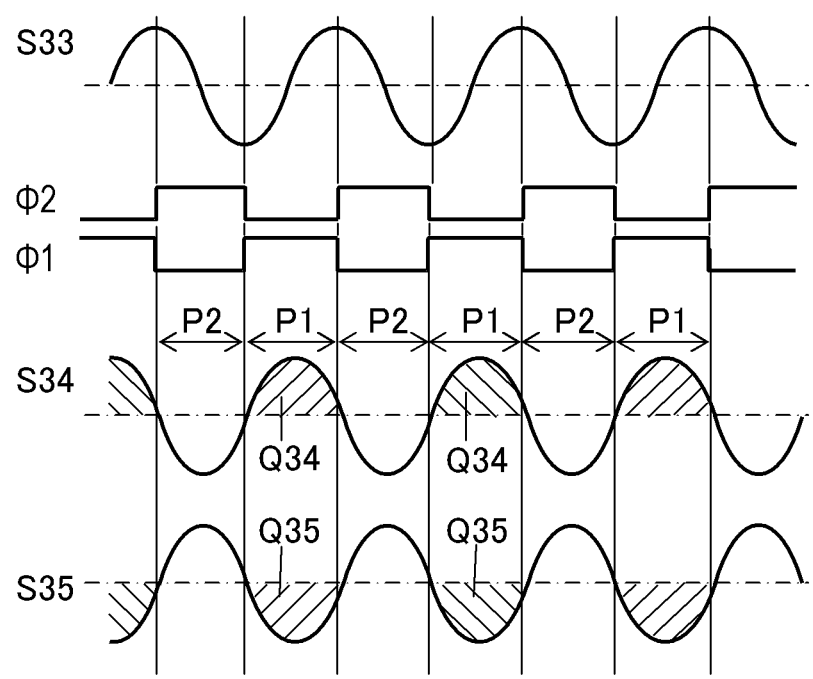
FIG. 2 shows signals supplied from the physical quantity sensor in accordance with Embodiment 1.

An operation of physical quantity sensor 1000 in accordance with Embodiment 1 will be described below. FIG. 2 shows signals of physical quantity sensor 1000.

An AC voltage applied to driving electrode 32 of detecting element 30 causes vibrating body 31 to resonate and vibrate at a resonance frequency, thereby generating an electric charge on monitor electrode 33. The electric charge is input to electric-charge amplifier 36 of driving circuit 40, and converted into an output voltage having a sine waveform. Electric-charge amplifier 36 supplies the output voltage to BPF 37. BPF 37 extracts only a frequency component of vibrating body 31 having the resonance frequency, and removes a noise component from the output voltage, and then outputs signal S33 having a sine waveform. Output signal S33 from BPF 37 of driver circuit 40 is input to the half-wave rectifying and smoothing circuit of AGC circuit 38, and then converted into a DC signal. When the DC signal becomes larger, AGC circuit 38 inputs a signal to driving circuit 39 for decreasing output signal S33 output from BPF 37 of driver circuit 40. When the DC signal becomes smaller, AGC circuit 38 inputs a signal to driving circuit 39 for increasing output signal S33 from BPF 37 of driver circuit 40. These operations cause vibrating body 31 to vibrate at a constant amplitude. Timing control circuit 43 receives signal S33 with the sine waveform. Timing generator 42 generates timing signals $\Phi 1$ and $\Phi 2$ shown in FIG. 2 based on a signal produced by multiplying signal S33 having the sine waveform at PLL circuit 41. Each of timing signals $\Phi 1$ and $\Phi 2$ have two values, a high level and a low level repeating alternately. Timing signals Φ1 and Φ2 have phases opposite to each other. To be more specific, when timing signal Φ1 has the high level, timing signal Φ2 has the low level. When timing signal Φ1 has the low level, timing signal Φ2 has the high level. Timing signals Φ1 and Φ2 are input to detection circuit 73 (ΣΔ modulator) and correction processor 75, and determine a timing of switching at detection circuit 73 (ΣΔ modulator) and correction processor 75 and determine a timing of latching of the latch circuit.

While vibrating body 31 having weight m of detecting element 30 warps and vibrates at velocity V in driving direction D31 shown in FIG. 1, and in this state, when vibrating body 31 rotates at angular velocity ω about a longitudinal direction of the body, Coriolis force F expressed below is generated on detecting element 30.

$$F = 2\,m\omega \times V$$

Coriolis force F generates electric charges on sensing electrodes 34 and 35 of detecting element 30. Detecting element 30 generates signals S34 and S35, electric currents, as shown in FIG. 2. Since the electric charges signals S34 and S35) generated on sensing electrodes 34 and 35 are produced by Coriolis force F, signals S34 and S35 have phases advancing, by 90 degrees, the phase of signal S33 generated on monitor electrode 33. As shown in FIG. 2, signals S34 and S35 have sine waveforms having phases opposite to each other, and are in a relation of a positive polarity signal and a negative polarity signal.

An operation of detection circuit 73 (ΣΔ modulator) will be described below. Timing signals Φ1 and Φ2 determine periods P1 and P2 repeating alternately and successively. Detection circuit 73 (ΣΔ modulator) ΣΔ-modulates signals S34 and S35 with timing signals Φ1 and Φ2, and converts signals S34 and S35 into one-bit digital signals.

An operation of detection circuit 73 during periods P1 and P2 will be described below. In the following description, a predetermined angular velocity, a physical quantity, is applied to detecting element 30 to cause detecting element 30 to rotate about a center axis of detecting element 30. Signals S34 and S35 output from sensing electrodes 34 and 35 have a maximum value "8".

During period P1 in which timing signal Φ1 has the high level, an output signal formed of electric charge Q34 corresponding to value "+8" generated by sensing electrode 34 is stored by capacitor 58 of integrating circuit 56, and a voltage caused by the electric charge stored by capacitor 58 is input to inversed input port 71a of comparator 71 of comparison circuit 70. During period P1, similarly, electric charge Q35 corresponding to value "−8" generated by sensing electrode 35 is stored by capacitor 69 of integrating circuit 67. A voltage caused by the electric charge corresponding to value "−8" stored by capacitor 69 is input to non-inversed input port 71b of comparator 71 of comparison circuit 70. Comparator 71 inputs a one-bit digital signal of value "1" as a result of the comparison into flip-flop 72, and the one-bit digital signal having value "1" is latched by flip-flop 72 at a rising of timing signal Φ2 (the beginning of period P2). Next, during period P2 in which timing Φ2 has the high level, switches 53 and 54 of DA output section 51 are turned on, so that the electric charge stored by capacitor 52 is discharged, and simultaneously, switches 64a and 64b of DA output section 62 are turned on, so that the electric charge stored by capacitor 63 is discharged. The digital signal having value "1" latched by flip-flop 72 is input to DA switch section 47 during next period P1, and is switched to reference voltage V50 that generates an electric charge corresponding to value "−10". Similarly, the digital signal having value "1" latched by flip-flop 72 is input to DA switch section 59 of DA converter 66, and is switched to reference voltage V60 that generates an electric charge corresponding to value "+10". This operation allows capacitor 52 of DA output section 51 to store an electric charge in response to the electric charges corresponding to value "−10" of reference voltage V50, and the stored electric charge is output to integrating circuit 56. At this moment, capacitor 63 of DA output section 62 stores an electric charge in response to the electric charge corresponding to value "+10" of reference voltage V60, and the stored electric charge is output to integrating circuit 67. During period P1, switch 55 is turned on, and the electric charge in response to the electric charge corresponding to value "8" generated by sensing electrode 34 of detecting element 30 is output to integrating circuit 56. Further, switch 65 is turned on, and sensing electrode 35 outputs, to integrating circuit 67, an electric charge in response to the electric charge corresponding to value "8".

During period P2, the above operation allows capacitor 58 of integrating circuit 56 to store an output signal of the electric charge corresponding to value "6" which is a result of integrating a total quantity of electric charge G34 shown in FIG. 2 and the electric charge output from DA converter 48. Similarly, during period P2, capacitor 69 of integrating circuit 67 stores an output signal of the electric charge corresponding to value "−6" which is a result of integrating a total quantity of electric charge G35 shown in FIG. 2 and the electric charge output from DA converter 66. Comparator 71 compares the signals output from integrating circuits 56 and 67 with each other, and outputs the comparison result as a one-bit digital signal to flip-flop 72. During periods P1 and P2, the voltage stored by integrating circuit 56 decreases by a voltage corresponding to the electric charge equivalent to value "2" every time the above operation are repeated. On the other hand, the voltage stored by integrating circuit 67 increases by a voltage corresponding to the electric charge equivalent to value "2". As a result, comparison circuit 70 continues to output a one-bit digital signal having value "1" until the voltages stored by integrating circuits 56 and 67 reach the electric charge corresponding to value 0 (zero). After that, the voltage stored by integrating circuit 56 reaches an electric charge corresponding to value "−2", and the voltage stored by integrating circuit 67 reaches an electric charge corresponding to value "+2", and then, comparator 71 outputs a one-bit digital signal having value "−1". This operation allows flip-flop 72 to output an output signal having value "−1" to DA switch sections 47 and 59. Then, DA converter 48 outputs a voltage having an electric charge corresponding to value "10" from reference voltage 49, and an electric charge corresponding to the voltage is stored by capacitor 52. At this moment, DA converter 66 outputs a voltage having an electric charge corresponding to value "−10" from reference voltage V61, and an electric charge corresponding to the voltage is stored by capacitor 63. As a result, integrating circuit 56 stores a voltage of an electric charge corresponding to value "+16", and integrating circuit 67 stores a voltage of an electric charge corresponding to value "−16". Then, the voltages output from integrating circuits 56 and 67 changes sequentially by a voltage corresponding to an electric charge corresponding to value "2". Comparator 71 outputs the one-bit digital signal of value "+1" nine times, and then, outputs one-bit digital signal of value "−1" once. These one-bit digital signals are subjected to a multi-bit process, and thus, an output signal of value "0.8" is output as a detection signal indicating the angular velocity (physical quantity). The one-bit digital signals output from detection circuit 73 are supplied to digital filter 74 to be subjected to a filtering process to remove a noise component from the signals, and detection value S74 indicating the angular velocity (physical quantity) is output from digital filter 74 to correction processor 75.

Figure 3:
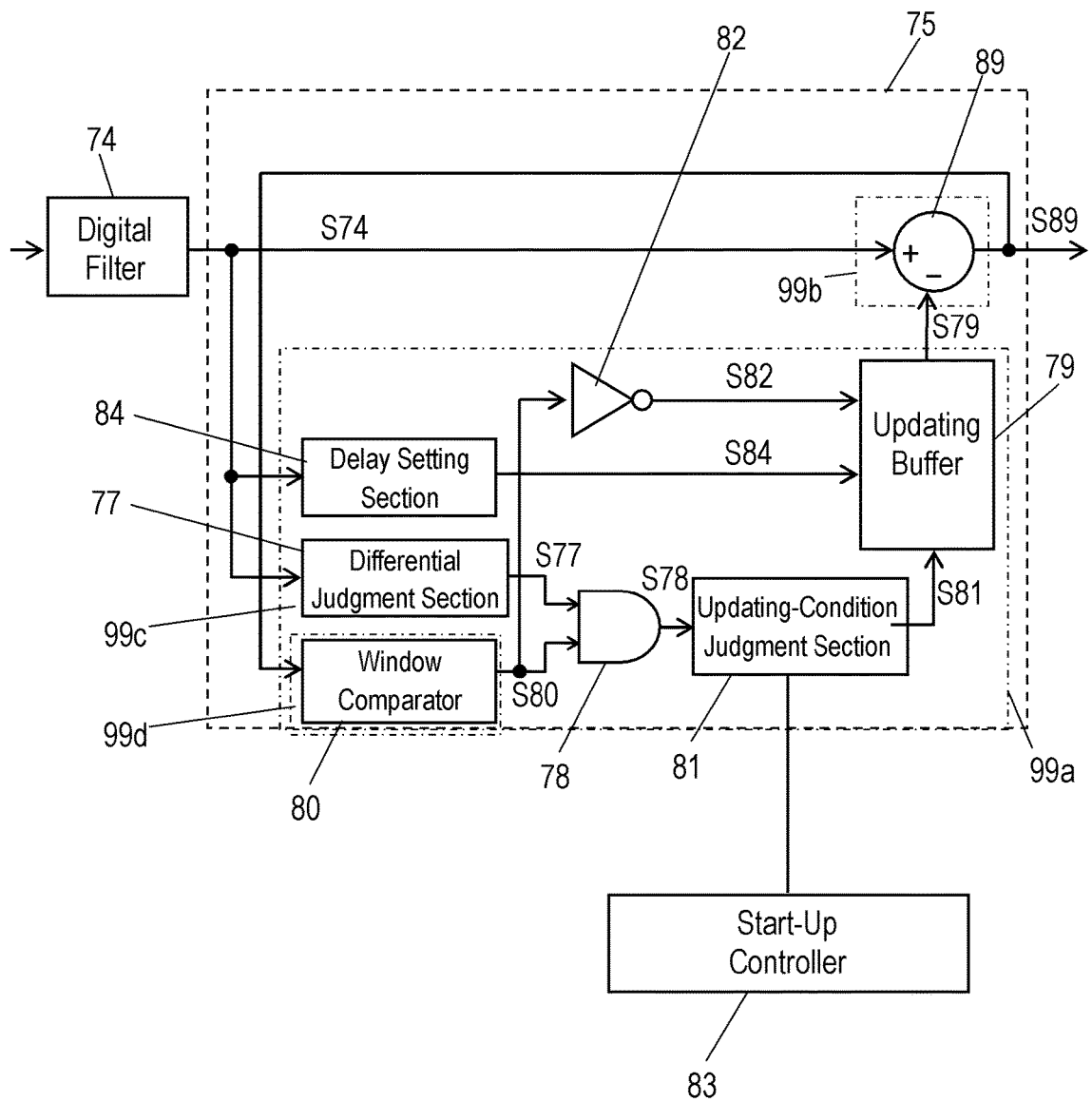
FIG. 3 is a circuit diagram of a correction processor of the physical quantity sensor in accordance with Embodiment 1.

FIG. 3 is a circuit diagram of correction processor 75. Correction processor 75 corrects detection value S74 and outputs it as corrected value S89. Correction processor 75 includes differential judgment section 77, AND processor 78, window-comparator 80, updating-condition judgment section 81, updating buffer 79, subtracter 89, and delay setting section 84. Differential judgment section 77 receives detection value S74. AND processor 78 receives a signal output from differential judgment section 77. Updating buffer 79 stores offset value S79. Subtracter 89 subtracts offset value S79 from detection value S74, and outputs corrected value S89. In physical quantity sensor 1000, correction processor 75 determines whether or not a change in detection value S74 is caused by a factor, such as a temperature drift, other than the physical quantity applied to detecting element 30. When the change is caused by a factor other than the physical quantity, correction processor 75 updates offset value S79 to cause corrected value S89 to be substantially 0 (zero). When the change in detection value S74 is caused by the physical quantity, updating buffer 79 stops updating offset value S79, and subtracter 89 outputs corrected value S89 that is obtained by subtracting the stored offset value S79 from detection value S74.

An operation of correction processor 75 will be detailed below. Delay setting section 84 outputs, to updating buffer 79, delayed detection value S84 obtained by delaying detection value S74 by a predetermined time. Differential judgment section 77 time-differentiates detection value S74 output from digital filter 74 (detection circuit 73) to obtain a differential value. When an absolute value of the differential value is not larger than differential threshold THD1 (800 deg/sec$^2$ according to Embodiment 1), differential judgment section 77 outputs signal S77 having a high level (an active level) to AND processor 78. When the absolute value of the differential value is larger than THD1, differential judgment section 77 outputs signal S77 having a low level (non-active level) to AND processor 78. When an absolute value of corrected value S89 output from subtracter 89 is not larger than a predetermined output threshold TH1 (2 deg/sec according to Embodiment 1), window comparator 80 outputs signal S80 having a high level (an active level) to AND processor 78. When the absolute value of corrected value S89 is larger than the predetermined output threshold TH1, window comparator 80 outputs signal S80 having a low level (a non-active level) to AND processor 78. AND processor 78 outputs high-level (active level) signal S78 only when both signals S77 and S80 output from differential judgment section 77 and window comparator 80 have the high level, and determines that an angular velocity (physical quantity) is not applied to detecting element 30. On the other hand, AND processor 78 outputs a low-level (non-active level) signal S78 when at least one of signals S77 and S80 has the low level (non-active level), and determines that the angular velocity (physical quantity) is applied to detecting element 30. When AND processor 78 outputs high-level (active level) signal S78 for a time not shorter than a predetermined drift duration (0.5 sec according to Embodiment 1), updating-condition judgment section 81 outputs update command signal S81 once to updating buffer 79. After outputting update command signal S81, updating-condition judgment section 81 outputs update command signal S81 to updating buffer 79 if AND processor 78 continues outputting high-level (active level) signal S78 for a time not shorter than a predetermined drift duration (0.5 sec according to Embodiment 1). Receiving update command signal S81, updating buffer 79 operates as to cause corrected value S89 output from subtracter 89 to be substantially 0 (zero). To be more specific, receiving update command signal S81, updating buffer 79 replaces offset value S79 with delayed detection value S84 at the timing of receiving signal 81 to update and stores offset value S79. When update command signal S81 is output, a time-differentiated value of detection value S74 is so small that detection value S74 change little. Therefore, offset value S79 is equal to detection value S74 just after receiving of update command signal S81. Under this condition, since subtracter 89 subtracts offset value S79 from detection value S74 to provide corrected value S89, corrected value S89 is substantially 0 (zero). According to Embodiment 1, updating buffer 79 maintains offset value S79 without updating it unless receiving update command signal S81.

NOT processor 82 reverses signal S80 output from window comparator 80, and outputs signal S82. In other words, NOT processor 82 outputs high-level (active level) signal S82 to updating buffer 79 when an absolute value of corrected value S89 is larger output threshold TH1 (2 deg/sec according to Embodiment 1), and outputs low-level (non-active level) signal S82 to updating buffer 79 when the absolute value of corrected value S89 is not larger than the output threshold value TH1. Receiving signal S82 having the low level, updating buffer 79 determines that an angular velocity (physical quantity) is applied to detecting element 30, and maintains the stored offset value S79 without updating it. Subtracter 89 subtracts the stored offset value 79 from detection value S74 to provide corrected value S89, and outputs corrected value S89.

Only at the startup of physical quantity sensor 1000, start-up controller 83 sets a value of the predetermined drift duration of updating-condition judgment section 81 shorter than a value of the drift duration in regular operation of physical quantity sensor 1000 after the startup of physical quantity sensor 1000. According to Embodiment 1, the drift duration at the startup is set at 0.15 sec that is shorter by 0.5 sec than the predetermined drift duration in the regular operation.

Figure 4:
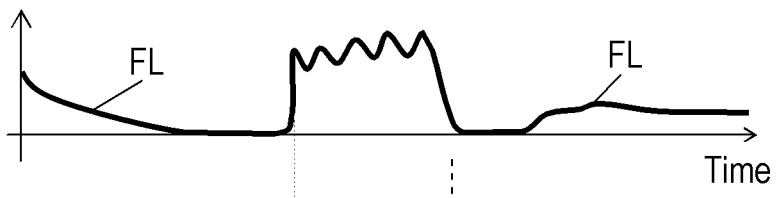
FIG. 4 shows signals of the physical quantity sensor in accordance with Embodiment 1.
Figure 4:
Figure 4:
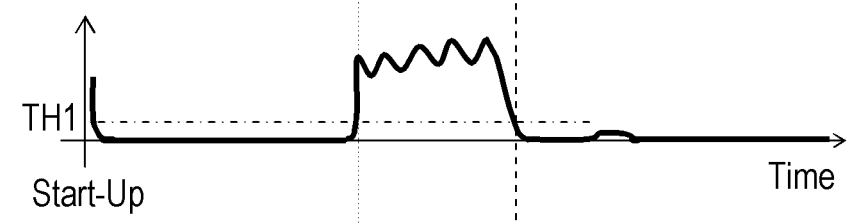
Figure 4:
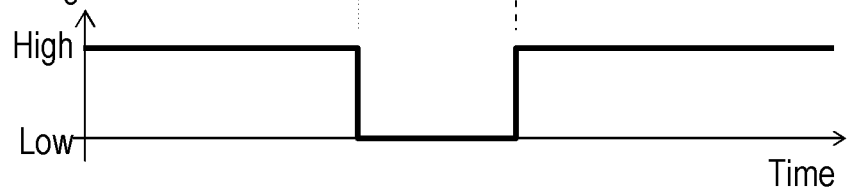

An operation of physical quantity sensor 1000 with a changing ambient temperature will be described below. FIG. 4 shows detection value S74 output from digital filter 74 (detection circuit 73), output signal S77 from differential judgment section 77, corrected value S89, and output signal S80 from window comparator 80. In FIG. 4, the horizontal axes represent time. A change in the ambient temperature of physical quantity sensor 1000 changes detection value S74 output from digital filter 74 (detection circuit 73). Fluctuation FL having a low frequency appears in detection value S74. An absolute value of a time-differentiation of fluctuation FL is not larger than a predetermined differential threshold THD 1 (800 deg/sec$^2$ according to Embodiment 1) of differential judgment section 77.

Since the time-differentiated value of fluctuation FL is not larger than the predetermined differential threshold THD1 (800 deg/sec$^2$ according to Embodiment 1), differential judgment section 77 outputs signal S77 having the high level. Window comparator 80 outputs signal S80 having a high level since an absolute value of corrected value S89 output from subtracter 89 is not larger than the predetermined threshold TH1 (2 deg/sec). AND processor 78 then outputs a high-level signal. When AND processor 78 continues outputting the high-level signal for a time not shorter than the predetermined drift duration (0.5 sec according to Embodiment 1), updating-condition judgment section 81 outputs update command signal S81 to updating buffer 79, and updating buffer 79 replaces offset value S79 with delayed detection value S84, thereby updating offset value S79 and storing the updated offset value S79. At this moment, an absolute value of a differentiated value of detection value S74 is so small that a change in detection value S74 may be small. Therefore, delayed detection value S84 is equal to detection value S74, and thus, offset value S79 is equal to detection value S74. Subtracter 89 subtracts offset value S79 from detection value S74 to provide corrected value S89. As shown in FIG. 4, updating buffer 79 corrects detection value S74 such that fluctuation FL having a low frequency and appearing in corrected value S89 becomes substantially 0 (zero).

At this moment, in the case that an angular velocity (physical quantity) is applied to detecting element 30, an erroneous correction in which buffer 79 erroneously and forcibly causes the corrected value S89 to be 0 (zero) is prevented. To achieve this prevention, in physical quantity sensor 1000 in accordance with Embodiment 1, window comparator 80 and NOT processor 82 detect the angular velocity (physical quantity) applied to detecting element 30, and updating buffer 79 stops updating offset value S79 and outputs corrected value S89 that is obtained by subtracting offset value S79 from detection value S74 to provide corrected value S89 for the angular velocity applied to the element.

Start-up controller 83 sets a value (0.15 sec according to Embodiment 1) of the predetermined drift duration used at a determination by updating-condition judgment section 81 shorter than a value (0.5 sec according to Embodiment 1) of the predetermined drift duration in regular operation except the startup. This setting allows physical quantity sensor 1000 to detect an angular velocity (physical quantity) accurately even at the startup providing an output from detection circuit 73 with a large change.

Figure 5A:
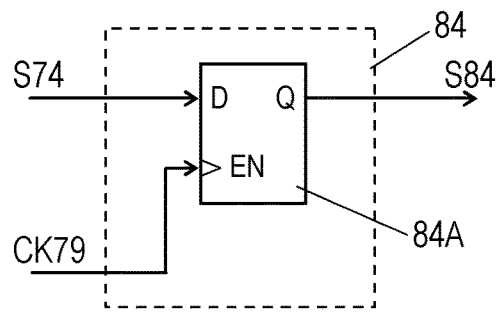
FIG. 5A is a circuit diagram of a delay setting section of the physical quantity sensor in accordance with Embodiment 1.
Figure 5B:
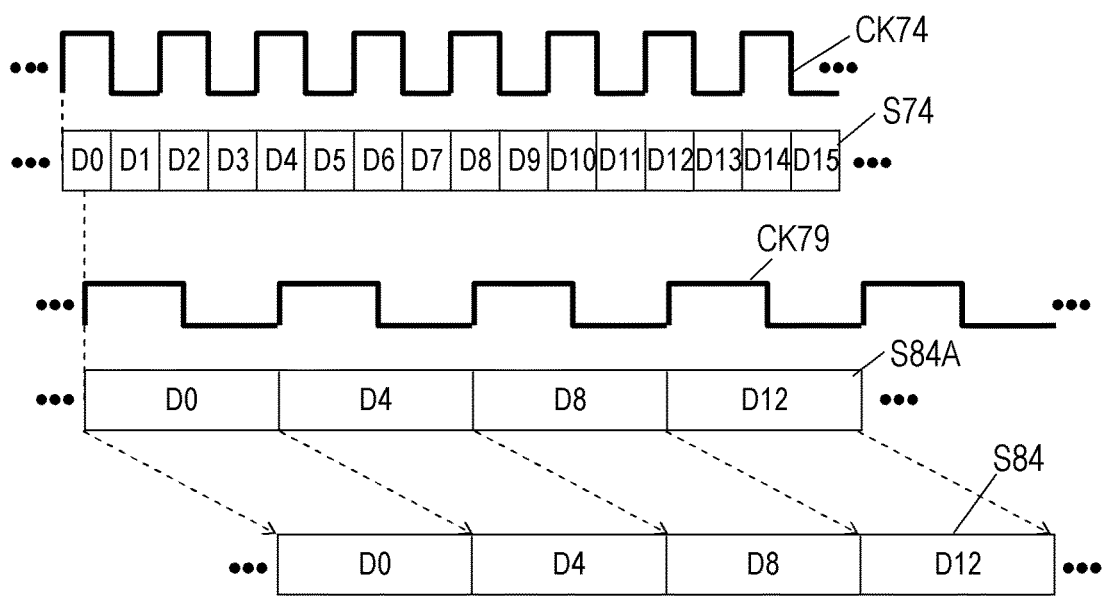
FIG. 5B shows signals of the delay setting section of the physical quantity sensor in accordance with Embodiment 1.

FIG. 5A is a circuit diagram of delay setting section 84. FIG. 5B shows signals of delay setting section 84. Delay setting section 84 includes delay elements 84A each including a D-type flip-flop. The number of delay elements 84A of delay setting section 84 is identical to the number of bits of detection value S74. As shown in FIG. 5B, detection circuit 73 outputs data D0, D1, . . . of detection value S74 via digital filter 74 synchronously with detection-value sampling clock CK74 having a predetermined period (0.05 sec according to Embodiment 1). Receiving update command signal S81, updating buffer 79 reads delayed detection value S84 as offset value S79 synchronously with update sampling clock CK79 having a period (0.2 sec according to Embodiment 1) obtained by multiplying the period of detection-value sampling clock CK74 by an updating rate ("4" according to Embodiment 1), and stores offset value S79. In other words, instead of data D0, D1, . . . of detection value S74, updating buffer 79 reads data D0, D4, D8, . . . and stores the read data as offset value S79. Since a time-differentiated value of fluctuation FL in detection value S74 corrected by updating buffer 79 and subtracter 89 is so small that fluctuation FL of detection value S74 changes slowly. As a result, updating buffer 79 stores thin-out data D0, D4, D8, . . . instead of all data D0, D1, . . . to obtain corrected value S89 having fluctuation FL sufficiently reduced.

Delay element 84A stores data D0, D4, D8, . . . of detection value S74 synchronously with update-sampling clock CK79. Delay element 84A then delays the data by one period of update-sampling clock CK79, namely, a period obtained by multiplying a period of detection-value sampling clock CK74 by the updating rate, and outputs the data as delayed detection value S84.

Figure 5C:
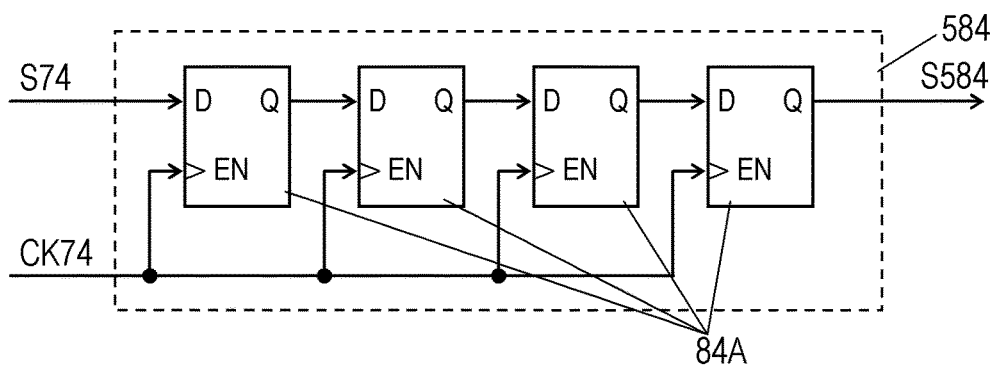
FIG. 5C is a circuit diagram of a comparative example of a delay setting section of the physical quantity sensor in accordance with Embodiment 1.

FIG. 5C is a circuit diagram of delay setting section 584, a comparative example. In FIG. 5C, components identical to those of delay setting section 84 in accordance with Embodiment 1 shown in FIG. 5A are denoted by the same reference numerals. Delay setting section 584 includes four delay elements 84A connected in series. Delay elements 84A are synchronized not with update-sampling clock CK79 but with detection-sampling clock CK 74 to read data D0, D1, D2, . . . of detection value S74 for delaying the data.

As shown in FIG. 5A, delay setting section 84 in accordance with Embodiment 1 does not require a large number of delay elements 84A of the comparative example, delay setting section 584, thus preventing delay setting section 84 from having a large size to enlarge a range of a delaying amount. Delay setting section 84 allows the angular velocity (physical quantity) to be detected accurately.

Updating buffer 79 may replace offset value S79 with detection value S74 instead of delayed detection value S84 to updating the offset value.

Correction processor 75 can be implemented not only by hardware but by software that is executed by a CPU.

As described above, correction processor 75 is configured to cause corrected value S89 to be substantially 0 (zero) if all of conditions that an absolute value of time-differentiated value of detection value S74 is not larger than the predetermined differential threshold THD1 and that an absolute value of corrected value S89 is not larger than the predetermined output threshold TH1 are satisfied.

Correction processor 75 may be configured to cause corrected value S89 to be substantially 0 (zero) when all of conditions that the absolute value of time-differentiated value of detection value S74 is not larger than the predetermined differential threshold THD1 and that the absolute value of corrected value S89 is not larger than the predetermined output threshold TH1 continue to be satisfied for a predetermined drift duration.

Correction processor 75 may be configured to determine a value of the predetermined drift duration at the startup of physical quantity sensor 1000 to be shorter than a value of the predetermined drift duration in a regular operation of physical quantity sensor 1000 other than the startup of physical quantity sensor 1000.

Correction processor 75 may be configured to store offset value S79 and replace offset value S79 with detection value S74 (delayed detection value S84) to update offset value 79 if all of conditions that the absolute value of time-differentiated value of detection value S74 is not larger than the predetermined differential threshold THD1 and that the absolute value of corrected value S89 is not larger than the predetermined output threshold TH1 are satisfied. In this case, correction processor 75 subtracts offset value S79 from detection value S74 to provide corrected value S89 to cause corrected value S89 to be substantially 0 (zero).

Correction processor 75 may be configures to replace offset value S79 with detection value S74 (delayed detection value S84) to update offset value 79 when all of conditions that the absolute value of time-differentiated value of detection value S74 is not larger than the predetermined differential threshold THD 1 and that the absolute value of corrected value S89 is not larger than the predetermined output threshold TH1 continue to be satisfied for the predetermined drift duration.

Correction processor 75 may be configured to maintain and store offset value S79 without updating offset value S79 if at least one of conditions that the absolute value of time-differentiated value of detection value S74 is larger than the predetermined differential threshold THD1 and that the absolute value of corrected value S89 is larger than the predetermined output threshold TH1 is satisfied.

Correction processor 75 may include delay setting section 84 that delays detection value S74 to output delayed detection value S84 and updating buffer 79 that stores offset value S79. In this case, detection circuit 73 (digital filter 74) outputs detection value S74 synchronously with detection-value sampling clock CK74. Updating buffer 79 reads delayed detection value S84 synchronously with update-sampling clock CK79 obtained by multiplying a period of detection-value sampling clock CK74 by an updating rate ("4"), and replaces offset value S79 with the read delayed detection value S84, to update offset value S79. Delay setting section 84 reads and delays detection value S74 synchronously with update-sampling clock CK79 and outputs delayed detection value S84.

As shown in FIG. 1 and FIG. 3, physical quantity sensor 1000 includes detection circuit 73, circuit 99a having an output signal from detection circuit 73 input thereto and circuit 99b having an output signal from detection circuit 73 and an output signal from circuit 99a input thereto. An output signal from circuit 99b is input to circuit 99a. Circuit 99a includes circuit 99c (differential judgment section 77) and circuit 99d (window comparator 80). The output signal from detection circuit 73 is input to circuit 99c. An output signal from circuit 99b is input to circuit 99d.

Detection circuit 73 outputs a signal output from detecting element 30 configured to have a physical quantity applied thereto.

Circuit 99b includes subtracter 83.

Circuit 99a further includes AND processor 78 and updating buffer 79. AND processor 78 receives an output from differential judgment section 77 and an output from window comparator 80. Updating buffer 79 receives an output signal from AND processor 78. Circuit 99b receives an output from updating buffer 79.

Detection circuit 73 is configured to cause an output signal from to be substantial 0 (zero) value if the output signal from differential judgment section 77 is within a predetermined range (according to Embodiment 1, an absolute value of the signal is not larger than a predetermined threshold) and the output signal supplied to window comparator 80 is within a predetermined range (according to Embodiment 1, the absolute value of the signal is not larger than a predetermined threshold).

Physical quantity sensor 1000 in accordance with Embodiment 1 detects an angular velocity as a physical quantity; however, it can detect other physical quantities, such as an amount of distortion acting on an object.

Exemplary Embodiment 2

Figure 6:
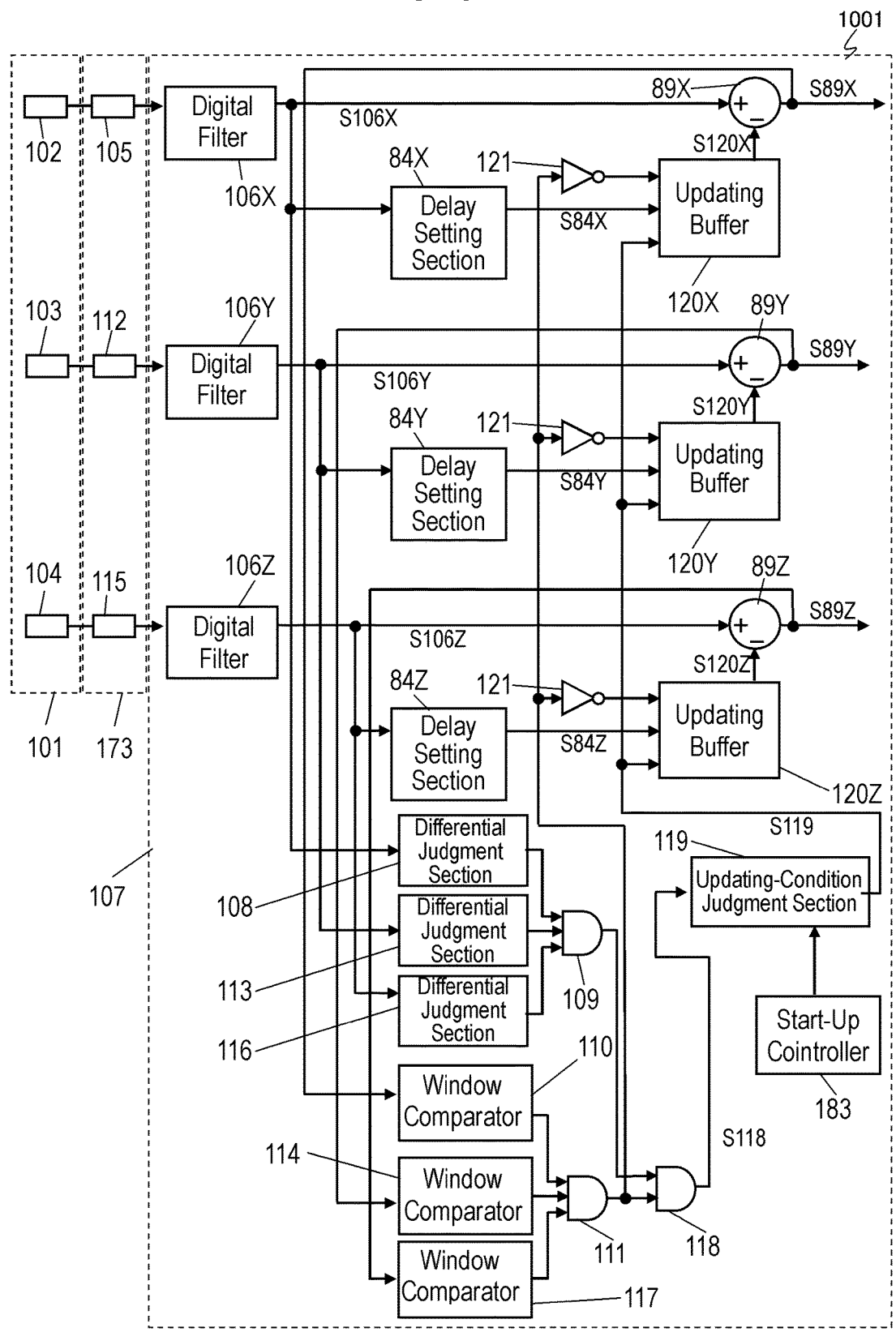
FIG. 6 is a circuit diagram of a physical quantity sensor in accordance with Exemplary Embodiment 2 of the present invention.

FIG. 6 is a circuit diagram of physical quantity sensor 1001 in accordance with Exemplary Embodiment 2. Sensor 1001 detects an angular velocity, a physical quantity, about an X-axis, a Y-axis, and a Z-axis perpendicular to each other.

As shown in FIG. 6, detecting element 101 implemented by a vibrator includes sensing electrode 102 of the X-axis, sensing electrode 103 of the Y-axis, and sensing electrode 104 of the Z-axis. Sensing electrode 102 detects an electric charge generated by a Coriolis force caused by angular velocity AX (physical quantity) about the X-axis. Sensing electrode 103 detects an electric charge generated by a Coriolis force caused by angular velocity AY (physical quantity) about the Y-axis. Sensing electrode 104 detects an electric charge generated by a Coriolis force caused by angular velocity AZ (physical quantity) about the Z-axis.

Detection circuit 105 of the X-axis, executing an operation similar to the operation of detection circuit 73 of physical quantity sensor 1000 in accordance with Embodiment 1 shown in FIG. 1, processes an output signal from sensing electrode 102 of detecting element 101 for outputting a digital signal indicating an angular velocity, a physical quantity, about the X-axis applied to detecting element 101). Digital filter 106X, executing an operation similar to the operation of digital filter 74 of physical quantity sensor 1000 in accordance with Embodiment 1 shown in FIG. 1, performs a filtering process for removing a noise component from the digital signal output from detection circuit 105 of the X-axis, and outputs the resultant digital signal as detection value S106X.

Detection circuit 112 of the Y-axis, executing an operation similar to the operation of detection circuit 73 of physical quantity sensor 1000 in accordance with Embodiment 1 shown in FIG. 1, processes an output signal from sensing electrode 103 of detecting element 101 for outputting a digital signal indicating an angular velocity, a physical quantity, about the Y-axis applied to detecting element 101). Digital filter 106Y, executing an operation similar to the operation of digital filter 74 of physical quantity sensor 1000 in accordance with Embodiment 1 shown in FIG. 1, performs a filtering process for removing a noise component from the digital signal output from detection circuit 112 of the Y-axis, and outputs the resultant digital signal as detection value S106Y.

Detection circuit 115 of the Z-axis, executing an operation similar to the operation of detection circuit 73 of physical quantity sensor 1000 in accordance with Embodiment 1 shown in FIG. 1, processes an output signal from sensing electrode 104 of detecting element 101 for outputting a digital signal indicating an angular velocity, a physical quantity, about the X-axis applied to detecting element 101. Digital filter 106Z, executing an operation similar to the operation of digital filter 74 of physical quantity sensor 1000 in accordance with Embodiment 1 shown in FIG. 1, performs a filtering process for removing a noise component from the digital signal supplied by detection circuit 115 of the Z-axis, and outputs the resultant digital signal as detection value S106Z. Detection circuit 105 of the X-axis, detection circuit 112 of the Y-axis, and detection circuit 115 of the Z-axis constitute detection circuit 173.

Correction processor 107 includes components similar to those of correction processor 75 of physical quantity sensor 1000 in accordance with Embodiment 1 shown in FIG.1. That is, correction processor 107 includes differential judgment section 108 of the X-axis, AND processor 109, window comparator 110 of the X-axis, AND processor 111, differential judgment section 113 of the Y-axis, window comparator 114 of the Y-axis, differential judgment section 116 of the Z-axis, window comparator 117 of the Z-axis, AND processor 118, updating buffer 120X of the X-axis, updating buffer 120Y of the Y-axis, updating buffer 120Z of the Z-axis, updating-condition judgment section 119, NOT processor 121, subtracter 89X of the X-axis, subtracter 89Y of the Y-axis, subtracter 89Z of the Z-axis, delay setting section 84X of the X-axis, delay setting section 84Y of the Y-axis, and delay setting section 84Z of the Z-axis. Updating buffers 120X, 120Y, and 120Z stores offset values S120X, S120Y, and S120Z, respectively. Subtracters 89X, 89Y, and 89Z subtract offset values S120X, S120Y, and S120Z from detection values S106X, S106Y, and S106Z to provide corrected values S89X, S89Y, and S89Z to output the corrected values, respectively.

A signal output from detection circuit 105 of the X-axis is supplied as detection value S106X to differential judgment section 108 of the X-axis via digital filter 106X. A signal output from differential judgment section 108 is supplied to AND processor 109. Corrected value S89X output from subtracter 89X of the X-axis is supplied to window comparator 110 of the X-axis. A signal output from window comparator 110 is supplied to AND processor 111. A signal output from detection circuit 112 of Y-axis is supplied as detection value S106Y to differential judgment section 113 of the Y-axis via digital filter 106Y. A signal output from differential judgment section 113 is supplied to AND processor 109. Corrected value S89Y output from subtracter 89Y of the Y-axis is supplied to window comparator 114 of the Y-axis. A signal output from window comparator 114 is supplied to AND processor 111. A signal output from detection circuit 115 of the Z-axis is supplied as detection value S106Z to differential judgment section 116 of the Z-axis via digital filter 106Z. A signal output from differential judgment section 116 is supplied to AND processor 109. Corrected value S89Z output from subtracter 89Z of Z-axis is supplied to window comparator 117 of the Z-axis. A signal output from window comparator 117 is supplied to AND processor 111. When the signals output from AND processors 109 and 111 both have a high level (active level), AND processor 118 outputs signal S118 having a high level (active level). When at least one of the signals output from AND processors 109 and 119 has a low level (non-active level), AND processor 118 outputs signal S118 having a low level (non-active level).

Delay setting section 84X of the X-axis delays, by a predetermined time, detection value S106X output from detection circuit 105 via digital filter 106X, thereby outputting delayed detection value S84X to updating buffer 120X. Delay setting section 84Y of the Y-axis delays, by a predetermined time, detection value S106Y output from detection circuit 112 via digital filter 106Y, thereby outputting delayed detection value S84Y to updating buffer 120Y. Delay setting section 84Z of the Z-axis delays, by a predetermined time, detection value S106Z output from detection circuit 115 via digital filter 106Z, thereby outputting delayed detection value S84Z to updating buffer 120Z.

Differential judgment section 108 outputs a high-level (active level) signal to AND processor 109 if an absolute value of a time-differentiated value of detection value S106X obtained by time-differentiating detection value S106X is not larger than a predetermined differential threshold THDX1 (800 deg/sect according to Embodiment 2 ). Differential judgment section 108 outputs a low-level (non-active) signal to AND processor 109 if the absolute value of the time-differentiated value of detection value S106X is larger than the predetermined differential threshold THDX1. Differential judgment section 113 outputs a high-level (active level) signal to AND processor 109 if an absolute value of a time-differentiated value of detection value S106Y obtained by time-differentiating detection value S106Y is not larger than a predetermined differential threshold THDY1 (800 deg/sec$^2$ according to Embodiment 2). Differential judgment section 113 outputs a low-level (non-active) signal to AND processor 109 if the absolute value of the time-differentiated value of detection value S106Y is larger than the predetermined differential threshold THDY1. Differential judgment section 116 outputs a high-level (active level) signal to AND processor 109 if an absolute value of a time-differentiated value of detection value S106Z obtained by time-differentiating detection value S106Z is not larger than a predetermined differential threshold THDZ1 (800 deg/sec$^2$ according to Embodiment 2). Differential judgment section 116 outputs a low-level (non-active) signal to AND processor 109 if the absolute value of the time-differentiated value of detection value S106Z is larger than the predetermined differential threshold THDZ1.

AND processor 109 outputs a high-level (active level) signal to AND processor 118 if all the signals output from differential judgment sections 108, 113, and 116 have a high level (active level). AND processor 109 outputs a low-level (non-active level) signal to AND processor 118 if at least one of the signals output from differential judgment sections 108, 113, and 116 has a low level (non-active level). Thus, AND processor 109 outputs a high-level signal to AND processor 118 if all of conditions that the absolute value of the time-differentiated value of detection value S106X is not larger than the predetermined differential threshold THDX1, that the absolute value of the time-differentiated value of detection value S106Y is not larger than the predetermined differential threshold THDY1, and that the absolute value of the time-differentiated value of detection value S106Z is not larger than the predetermined differential threshold THDZ1 are satisfied. On the other hand, AND processor 109 outputs a low-level signal to AND processor 118 if at least one of conditions that the absolute value of the time-differentiated value of detection value S106X is larger than the predetermined differential threshold THDX1, that the absolute value of the time-differentiated value of detection value S106Y is larger than the predetermined differential threshold THDY1, and that the absolute value of the time-differentiated value of detection value S106Z is larger than the predetermined differential threshold THDZ1 is satisfied.

Window comparator 110 outputs a high-level signal if an absolute value of corrected value S89X is not larger than the predetermined output threshold THX1 (2 deg/sec according to Embodiment 2), and outputs a low-level signal to AND processor 111 if the absolute value of corrected value S89X is larger than the predetermined output threshold THX1. Similarly, window comparator 114 outputs a high-level signal if an absolute value of corrected value S89Y is not larger than the predetermined output threshold THY1 (2 deg/sec according to Embodiment 2), and outputs a low-level signal to AND processor 111 if the absolute value of corrected value S89Y is larger than the predetermined output threshold THY1. Window comparator 117 outputs a high-level signal if an absolute value of corrected value S89Z is not larger than a predetermined output threshold THZ1 (2 deg/sec according to Embodiment 2), and outputs a low-level signal to AND processor 111 if the absolute value of corrected value S89Z is larger than the predetermined output threshold THZ1. AND processor 111 outputs a high-level (active level) signal to AND processor 118 if all the signals output from window comparators 110, 114, and 117 have a high level (active level). AND processor 111 outputs a low-level (non-active level) signal to AND processor 118 if at least one of the signals output from window comparators 110, 114, and 117 has a low level (non-active level). Thus, AND processor 111 outputs the high-level signal to AND processor 118 if all of conditions that the absolute value of corrected value S89X is not larger than the predetermined output threshold value THX1, that the absolute value of corrected value S89Y is not larger than the predetermined output threshold value THY1, and that the absolute value of corrected value S89Z is not larger than the predetermined output threshold value THZ1 are satisfied. AND processor 111 outputs the low-level (non-active level) signal to AND processor 118 if at least one of conditions that the absolute value of corrected value S89X is larger than the predetermined output threshold THX1, that the absolute value of corrected value S89Y is larger than the predetermined output threshold THY1, and that the absolute value of corrected value S89Z is larger than the predetermined output threshold THZ1 is satisfied.

AND processor 118 outputs signal S118 having a high level (active level) only if both the signals output from AND processors 109 and 111 have a high level (active level), and then recognizes that an angular velocity (physical quantity) is not applied to detecting element 101 from the outside detecting element 101. On the other hand, AND processor 118 outputs signal S118 having a low level (non-active level) if at least one signal out of the signals output from AND processors 109 and 111 has a low level (non-active level), and then recognizes that an angular velocity (physical quantity) is applied to detecting element 101 from the outside of detecting element 101. Updating-condition judgment section 119 outputs update command signal S119 once to updating buffers 120X, 120Y, and 120Z when the signal S118 having the high level continues to be output from AND processor 118 for a time not shorter than a predetermined drift duration (0.5 sec according to Embodiment 2). Even after outputting update command signal S119, when AND processor 118 still continues to output signal S118 having the high level (active level) for a time not shorter than the predetermined drift duration, updating-condition judgment section 119 further outputs update command signal S119 to updating buffers 120X, 120Y, and 120Z. Then, similarly to updating buffer 79 of physical quantity sensor 1000 in accordance with Embodiment 1, updating buffers 120X, 120Y, and 120Z cause corrected values S89X, S89Y, and S89Z to be substantially 0 (zero). To be more specific, receiving the update command signal S119, updating buffers 120X, 120Y, and 120Z replace offset values S120X, S120Y, and S120Z with delayed detection values S84X, S84Y, and S84Z and store offset values S120X, S120Y, and S120Z, thereby updating offset values S120X, S120Y, and S120Z, respectively. In the case that update command signal S119 is output, the time-differentiated values of detection values S106X, S106Y, and S106Z are so small that detection values S106X, S106Y, and S106Z ay change little. Therefore, offset values S120X, S120Y, and S120Z are equal to delayed detection values S84X, S84Y, and S84Z, respectively, just after receiving the update command signal. In this case, subtracters 89X, 89Y, and 89Z subtract offset values S120X, S120Y, and S120Z from detection values S106X, S106Y, and S106Z to provide corrected values S89X, S89Y, and S89Z, respectively. Then, corrected values S89X, S89Y, and S89Z become substantially 0 (zero). Unless receiving update command signal S119, updating buffers 120X, 120Y, and 120Z maintain and store offset values S120X, S120Y, and S120Z without updating offset values S120X, S120Y, and S120Z.

NOT processor 121 reverses a signal output from AND processor 111 and outputs the reversed signal. In other words, NOT processor 121 outputs a high-level signal if at least one of conditions that the absolute value of corrected value S89X is larger than the predetermined output threshold THX1 (2 deg/sec according to Embodiment 2) of window comparator 110, that the absolute value of corrected value S89Y is larger than the predetermined output threshold THY1 (2 deg/sec according to Embodiment 2) of window comparator 114, and that the absolute value of corrected value S89Z is larger than the predetermined output threshold THZ1 (2 deg/sec according to Embodiment 2) of window comparator 117 is satisfied. NOT processor 121 outputs a low-level signal if all of conditions that the absolute value of corrected value S89X is not larger than the predetermined threshold THX1, that the absolute value of corrected value S89Y is not larger than the predetermined threshold THY1, and that the absolute value of corrected value S89Z is not larger than the predetermined threshold THZ1 are satisfied. Upon receiving the high-level signal output from NOT processor 121, updating buffers 120X, 120Y, and 120Z determine that angular velocities AX, AY, and AZ (physical quantities) are applied to detecting element 101, and maintain offset values S120X, S120Y, and S120Z, not updating offset values S120X, S120Y, and S120Z. Subtracters 89X, 89Y, and 89Z subtract offset values S120X, S120Y, and S120Z from detection value S106X, S106Y, and S106Z output from digital filters 106X, 106Y, and 106Z to provide and output corrected values S89X, S89Y, and S89Z, respectively.

Figure 7A:
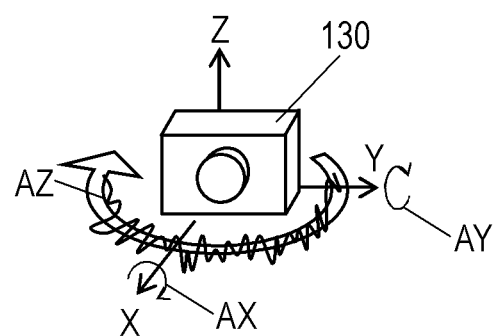
FIG. 7A is a schematic view of an electronic device having the physical quantity sensor in accordance with Embodiment 2 mounted thereto.
Figure 7B:
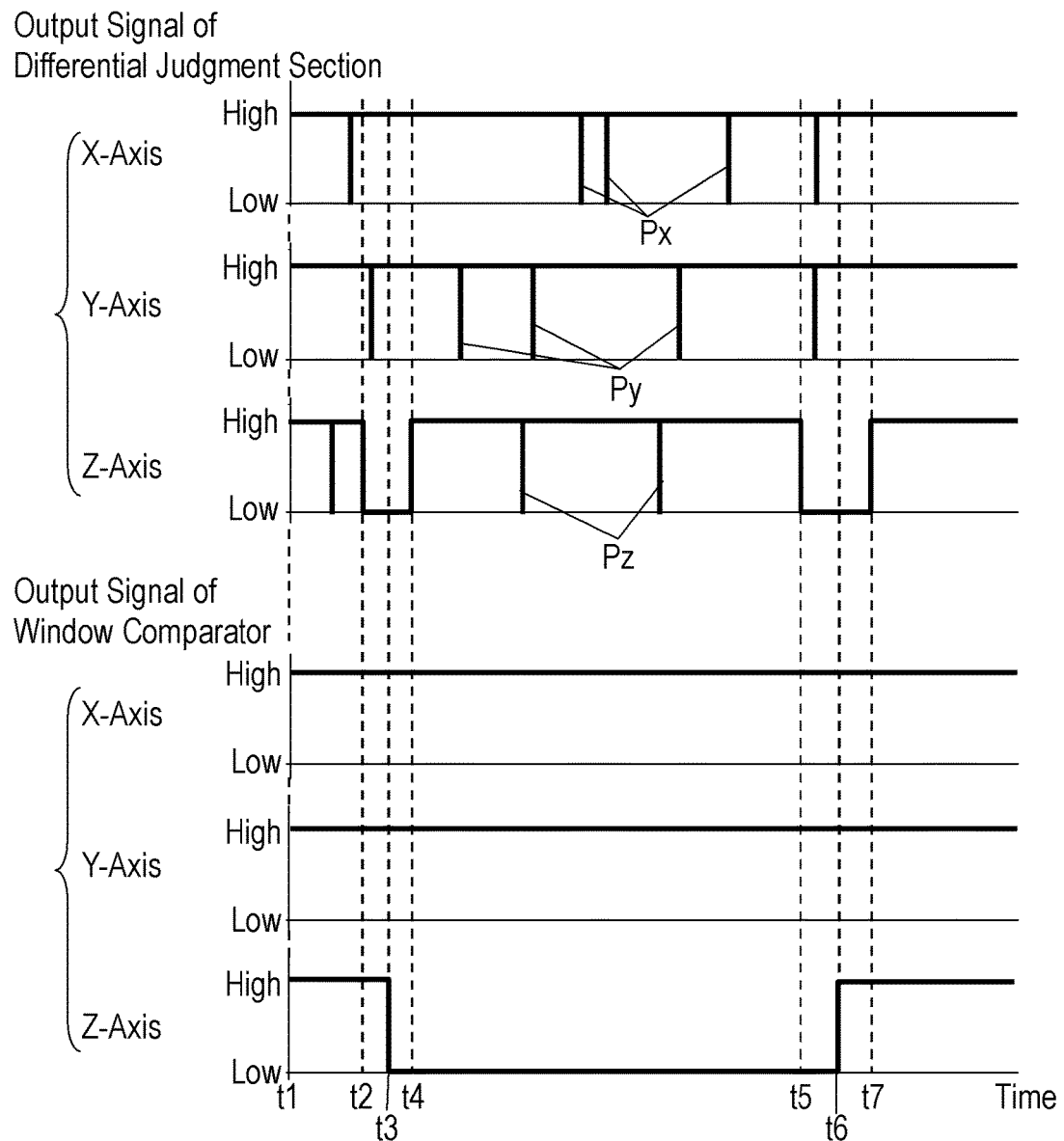
FIG. 7B shows signals of the physical quantity sensor in accordance with Embodiment 2.

FIG. 7A is a perspective view of electronic apparatus 130 having physical quantity sensor 1001 in accordance with Embodiment 2 mounted thereto. FIG. 7B shows signals output from differential judgment section 108 of the X-axis, differential judgment section 113 of the Y-axis, differential judgment section 116 of the Z-axis, window comparator 110 of the X-axis, window comparator 114 of the Y-axis, and window comparator 117 of the Z-axis. Electronic apparatus 130 is a digital still camera. An operation of physical quantity sensor 1001 while, as shown in FIG. 7A, electronic apparatus 130 (digital still camera) rotates about the Z-axis (a vertical axis) at constant angular velocity AZ for panorama shooting will be described below. To be more specific, electronic apparatus 130 is forced to stop moving by an operator from time point t1 to time point t2 shown in FIG. 7B. The operator rotates electronic apparatus 130 about the Z-axis at angular velocity AZ increasing from time point t2 to time point t4. The operator rotates electronic apparatus 130 at constant angular velocity AZ about the Z-axis from time point t4 to time point t5. The operator rotates electronic apparatus 130 about the Z-axis at angular velocity AZ decreasing from time point t5 to time point t7. The operator halts the rotation of electronic apparatus 130 at time point t7. The operator stops moving rotates electronic apparatus 130 from time point t7.

During a period from time point t2 to time point t4 and a period from time point t5 to time point t7, an absolute value of a time-differentiated value of angular velocity AZ about Z-axis is large, so that the absolute value of the time-differentiated value of corrected value S89Z is larger than the predetermined differential threshold THDZ1. As a result, differential judgment section 116 outputs a low-level signal. The periods other than the above two periods, the absolute value of the time-differentiated value of corrected value S89Z is not larger than the predetermined differential threshold THDZ1, so that differential judgment section 116 outputs a high-level signal. Angular velocity AZ about Z-axis exceeds the predetermined output threshold THZ1 at time point t3 between time point t2 and time point t4, and then, decreases to a level not larger than the predetermined output threshold THZ1 at time point t6 between time point t5 and time point t7. Angular velocity AZ about the Z-axis thus is larger than the predetermined output threshold THZ1 during the period from time point t3 to time point t6, so that window comparator 117 outputs a low-level signal. Window comparator 117 outputs a high-level signal during a period from time point t1 to time point t3 as well as during a period from time point t6.

After time point t7, the operator does not rotate electronic apparatus 130 about the X-axis or Y-axis, so that differential judgment section 108 of the X-axis and differential judgment section 113 of the Y-axis output high-level signals after time point t1, and window comparator 110 of the X-axis as well as window comparator 114 of the Y-axis output high-level signals after time point t1.

In the case that electronic apparatus 130 rotates at constant angular velocity AZ about Z-axis, micro-vibration may occur due to hand-shake, and involves angular velocities AX and AY about the X-axis and Y-axis, respectively. The signals output from differential judgment section 108 of the X-axis and differential judgment section 113 of the Y-axis may generate pulses Px and Py having short widths and irregularly changing from a high-level to a low-level. It is difficult to keep angular velocity AZ about the Z-axis strictly at a constant velocity and an angular acceleration about the Z-axis may occur. As a result, differential judgment section 116 of the Z-axis may outputs a signal containing pulses PZ having short widths and changing irregularly from the high-level to the low-level besides the low level signal maintained for a long time.

During the period from time point t1 to time point t2 and the period from time point t7, both of AND processors 109 and 111 output high-level signals, and AND processor 118 outputs a high-level signal. Updating buffers 120X, 120Y, and 120Z set the stored offset values S120X, S120Y, and S120Z at delayed detection values S84X, S84Y, and S84Z, thereby updating and storing offset values S120X, S120Y, and S120Z and output these offset values S120X, S120Y, and S120Z to subtracters 89X, 89Y, and 89Z, respectively. Subtracters 89X, 89Y, and 89Z subtract offset values S120X, S120Y, and S120Z from detection values S106X, S106Y, and S106Z, thereby causing corrected value S89X, S89Y, and S89Z to be substantially 0 (zero).

During the period from time point t2 to time point t3 and the period from time point t6 to time point t7, since AND processor 109 outputs a low-level signal, AND processor 118 outputs a low level signal. Updating buffers 120X, 120Y, and 120Z therefore do not update but do maintain offset values S120X, S120Y, and S120Z. Subtracters 89X, 89Y, and 89Z subtract offset values S120X, S120Y, and S120Z from detection values S106X, S106Y, and S106Z and output corrected values S89X, S89Y, and S89Z, respectively.

During the period from time point t3 to time point t6, AND processor outputs a low-level signal, and NOT processor 121 outputs a high-level signal, so that updating buffers 120X, 120Y, and 120Z do not update but do maintain offset values S120X, S120Y, and S120Z. Subtracters 89X, 89Y, and 89Z subtract offset values S120X, S120Y, and S120Z from detection values S106X, S106Y, and S106Z provide and output corrected values S89X, S89Y, and S89Z, respectively. Corrected values S89X, S89Y, and S89Z indicating the angular velocity about the Z-axis can be thus obtained. During the period from time point t3 to time point t6, as shown in FIG. 7B, even if the signals output from differential judgment sections 108, 113, and 116 contain pulses having short widths and extending to the low-level, the high-level signal output from NOT processor 121 prevents updating buffers 120X, 120Y, and 120Z from erroneously updating the valued stored by the buffers.

In physical quantity sensor 1001 in accordance with Embodiment 2, the predetermined output thresholds THX1, THY1, and THZ1 are identical to each other, but may different from each other. Similarly, the predetermined differential thresholds THDX1, THDY1, and THDZ1 are identical to each other according to Embodiment 2, but may be different from each other.

Updating buffers 120X, 120Y, and 120Z may replace offset values S120X, S120Y, and S120Z with detection values S106X, S106Y, and S106Z respectively instead of delayed detection values S84X, S84Y, and S84Z to update offset values S120X, S120Y, and S120Z, respectively.

Physical quantity sensor 1001 in accordance with Embodiment 2 detects angular velocities about the three axes, namely, the X-axis, Y-axis, and Z-axis; however, it can be a physical quantity sensor for detecting angular velocities about two axes, namely, the X-axis and Z-axis, providing the same effects.

As described above, correction processor 107 is configured to cause corrected values S89X and S89Y to be substantially 0 (zero) if all of conditions that the absolute value of time-differentiated value of detection value S106X is not larger than the predetermined differential threshold THDX1, that the absolute value of corrected value S89X is not larger than the predetermined output threshold THX1, that the absolute value of time-differentiated value of detection value S106Y is not larger than the predetermined differential threshold THDY1, and that the absolute value of corrected value S89Y is not smaller than the predetermined output threshold THY1 are satisfied.

Correction processor 107 may be configured to cause corrected values S89X and S89Y to be substantially 0 (zero) when all of the conditions that the absolute value of time-differentiated value of detection value S106X is not larger than the predetermined differential threshold THDX1, that the absolute value of corrected value S89X is not larger than the predetermined output threshold THX1, that the absolute value of time-differentiated value of detection value S106Y is not larger than the predetermined differential threshold THDY1, and that the absolute value of corrected value S89Y is not larger than the predetermined output threshold THY1 continue to be satisfied for the predetermined drift duration.

Correction processor 107 may determine a value of the predetermined drift duration at the start-up of physical quantity sensor 1001 to be shorter than a value of the predetermined drift duration in regular operation of physical quantity sensor 1001 other than the start-up of physical quantity sensor 1001.

Correction processor 107 may be configured to store offset values S120X and S120Y, and replaces offset values S120X and S120Y with detection values S106X and S106Y (delayed detection values S84X and S84Y) to update offset values S120X and S120Y, respectively, if all of conditions that the absolute value of the time-differentiated value of detection value S106X is not larger than the predetermined differential threshold THDX1, that the absolute value of corrected value S89X is not larger than the predetermined output threshold THX1, that the absolute value of the time-differentiated value of detection value S106Y is not larger than the predetermined differential threshold THDY1, and that the absolute value of corrected value S89Y is not larger than the predetermined output threshold THY1 are satisfied. In this case, correction processor 107 subtracts offset values S120X and S120Y from detection value S106X and S106Y to provide corrected values S89X and S89Y, respectively, thereby causing corrected values S89X and S89Y substantially 0 (zero).

Correction processor 107 may be configured to store detection values S106X and S106Y (S89X and S89Y) as offset values S120X and S120Y to update offset values S120X and S20Y, respectively, when all of conditions that the absolute value of the time-differentiated value of detection value S106X is not larger than the predetermined differential threshold THDX1, that the absolute value of corrected value S89X is not larger than the predetermined output threshold THX1, the absolute value of the time-differentiated value of detection value S106Y is not larger than the predetermined differential threshold THDY1, and that the absolute value of corrected value S89Y is not larger than the predetermined output threshold THY1 continue to be satisfied for the predetermined drift duration.

Correction processor 107 may be configured to maintain offset values S120X and S120Y without updating offset values S120X and S120Y if at least one of conditions that the absolute value of the time-differentiated value of detection value S106X is larger than the predetermined differential threshold THDX1, that the absolute value of corrected value S89X is larger than the predetermined output threshold THX1, that the absolute value of the time-differentiated value of detection value S106Y is larger than the predetermined differential threshold THDY1, and that the absolute value of corrected value S89Y is larger than the predetermined output threshold THY1 is satisfied.

Correction processor 107 may be configured to cause corrected values S89X, S89Y, and S89Z to be substantially 0 (zero) if all of conditions that the absolute value of the time-differentiated value of detection value S106X is not larger than the predetermined differential threshold THDX1, that the absolute value of corrected value S89X is not larger than the predetermined output threshold THX1, that the absolute value of the time-differentiated value of detection value S106Y is not larger than the predetermined differential threshold THDY1, that the absolute value of corrected value S89Y is not larger than the predetermined output threshold THY1, that the absolute value of the time-differentiated value of detection value S106Z is not larger than the predetermined differential threshold THDZ1, and that the absolute value of corrected value S89Z is not larger than the predetermined output threshold THZ1 are satisfied.

Correction processor 107 may be configured to cause corrected values S89X, S89Y, and S89Z to be substantially 0 (zero) when all of conditions that the absolute value of the time-differentiated value of detection value S106X is not larger than the predetermined differential threshold THDX1, that the absolute value of corrected value S89X is not larger than the predetermined output threshold THX1, that the absolute value of the time-differentiated value of detection value S106Y is not larger than the predetermined differential threshold THDY1, that the absolute value of corrected value S89Y is not larger than the predetermined output threshold THY1, that the absolute value of the time-differentiated value of detection value S106Z is not larger than the predetermined differential threshold THDZ1, and that the absolute value of corrected value S89Z is not larger than the predetermined output threshold THZ1 continue to be satisfied for a predetermined drift duration.

Correction processor 107 may be configured to determine a value of the predetermined drift duration at the start-up of physical quantity sensor 1001 shorter than a value of the predetermined drift duration in a regular operation of physical quantity sensor 1001 other than that of the startup of physical quantity sensor 1001.

Correction processor 107 may be configured to store offset values S120X, S120Y, and S120Z, and replace offset values S120X, S120Y, and S120Z with detection values S106X, S106Y, and S106Z (delayed detection values S84X, S84Y, and S84Z) to update offset values S120X, S120Y, and S120Z if all of conditions that the absolute value of the time-differentiated value of detection value S106X is not larger than the predetermined differential threshold THDX1, that the absolute value of corrected value S89X is not larger than the predetermined output threshold THX1, that the absolute value of the time-differentiated value of detection value S106Y is not larger than the predetermined differential threshold THDY1, that the absolute value of corrected value S89Y is not larger than the predetermined output threshold THY1, that the absolute value of the time-differentiated value of detection value S106Z is not larger than the predetermined differential threshold THDZ1, and that the absolute value of corrected value S89Z is not larger than the predetermined output threshold THZ1 are satisfied. In this case, correction processor 107 subtracts offset values S120X, S120Y, and S120Z from detection values S106X, S106Y, and S106Z to provide corrected values S89X, S89Y, and S89Z, thereby causing corrected values S89X, S89Y, and S89Z to be substantially 0 (zero).

Correction processor 107 may be configured to replace offset values S120X, S120Y, and S120Z with detection values S106X, S106Y, and S106Z (delayed detection values S84X, S84Y, and S84Z) to update offset values S120X, S120Y, and S120Z when all of conditions that the absolute value of the time-differentiated value of detection value S106X is not larger than the predetermined differential threshold THDX1, that the absolute value of corrected value S89X is not larger than the predetermined output threshold THX1, that the absolute value of the time-differentiated value of detection value S106Y is not larger than the predetermined differential threshold THDY1, that the absolute value of corrected value S89Y is not larger than the predetermined output threshold THY1, that the absolute value of the time-differentiated value of detection value S106Z is not larger than the predetermined differential threshold THDZ1, and that the absolute value of corrected value S89Z is not larger than the predetermined output threshold THZ1 continue to be satisfied for the predetermined drift duration.

Correction processor 107 may be configured to maintain and store offset values S120X, S120Y, and S120Z without updating offset values S120X, S120Y, and S120Z if at least one of conditions that the absolute value of the time-differentiated value of detection value S106X is larger than the predetermined differential threshold THDX1, that the absolute value of corrected value S89X is larger than the predetermined output threshold THX1, that the absolute value of the time-differentiated value of detection value S106Y is larger than the predetermined differential threshold THDY1, that the absolute value of corrected value S89Y is larger than the predetermined output threshold THY1, that the absolute value of the time-differentiated value of detection value S106Z is larger than the predetermined differential threshold THDZ1, and that the absolute value of corrected value S89Z is larger than the predetermined output threshold THZ1 is satisfied.

Correction processor 107 may be implemented not only by hardware but also by software that is executed by a CPU.

Exemplary Embodiment 3

Figure 8:
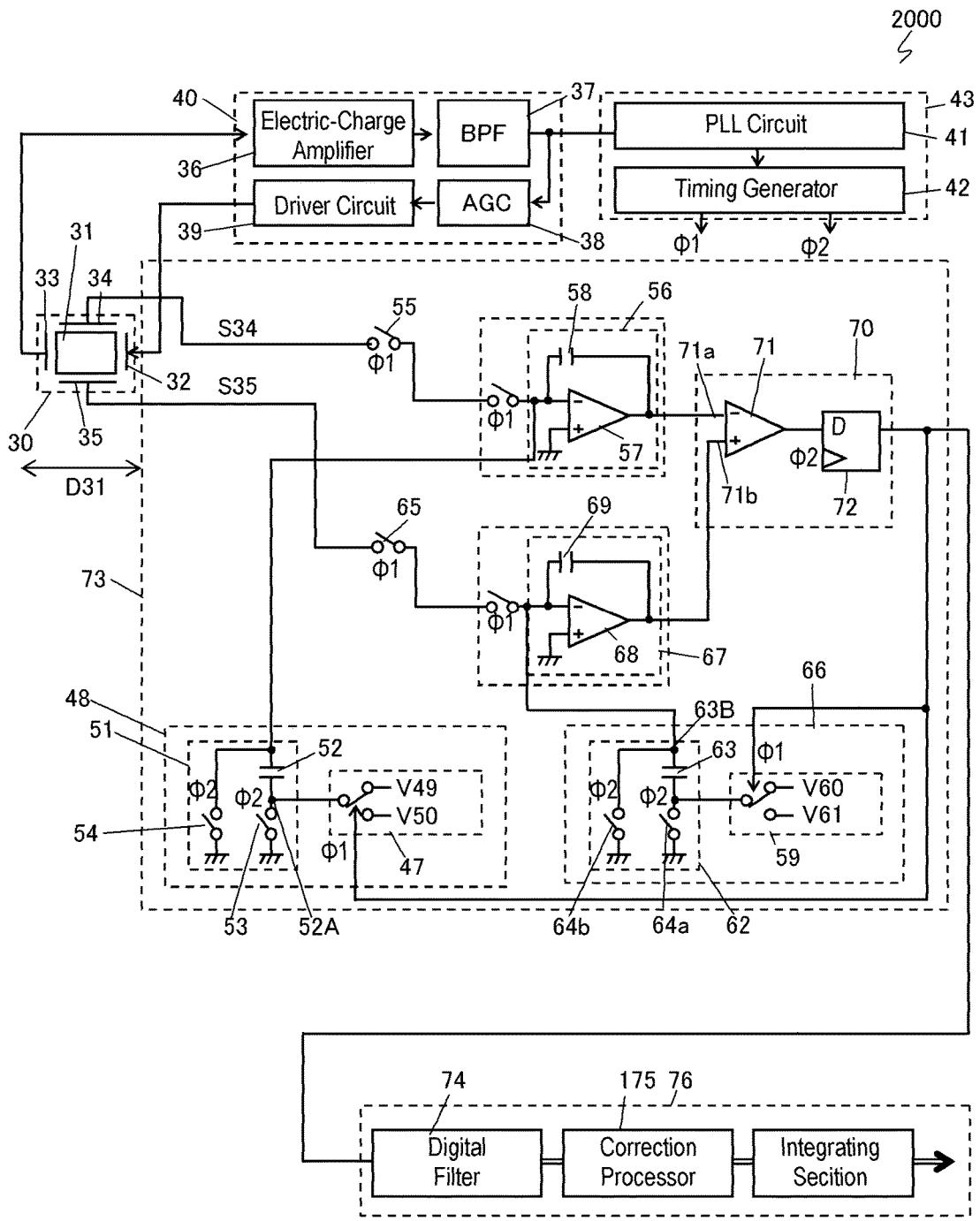
FIG. 8 is a circuit diagram of a physical quantity sensor in accordance with Exemplary Embodiment 3 of the present invention.

FIG. 8 is a circuit diagram of physical quantity sensor 2000 in accordance with Exemplary Embodiment 3. In FIG. 8, components identical to those of physical quantity sensor 1000 in accordance with Embodiment 1 shown in FIGS. 1 to 3 are denoted by the same reference numerals. Physical quantity sensor 2000 includes correction processor 175 instead of correction processor 75 of physical quantity sensor 1000 according to Embodiment 1.

Figure 9:
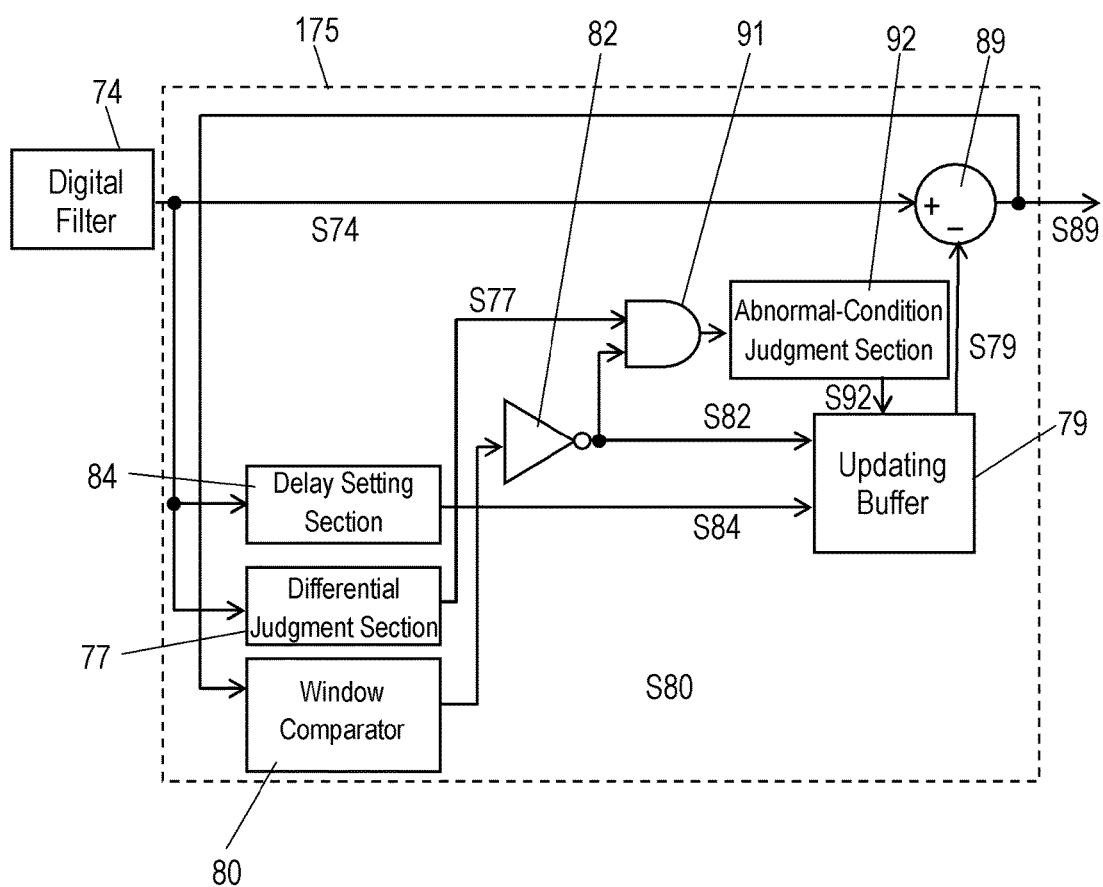
FIG. 9 is a circuit diagram of a correction processor of the physical quantity sensor in accordance with Embodiment 3.

FIG. 9 is a circuit diagram of correction processor 175. Correction processor 175 includes AND processor 91 and abnormal-condition judgment section 92 instead of AND processor 78 and updating-condition judgment section 81 of correction processor 75 of physical quantity sensor 1000 in accordance with Embodiment 1. Subtracter 89 subtracts offset value S79 from detection value S74 to provide corrected value S89. AND processor 91 outputs a high-level (active level) signal when both a signal output from differential judgment section 77 and a signal output from NOT processor 82 both have a high level (an active level). AND processor 91 outputs a low-level (non-active level) signal when at least one of the signal output from differential judgment section 77 and the signal output from NOT processor 82 has a low level (a non-active level). In other words, AND processor 91 outputs the high-level (active level) signal and determines that an angular velocity (physical quantity) is not applied to detecting element 30 (shown in FIG. 1) if all of conditions that an absolute value of a time-differentiated value of detection value S74 is not larger than a predetermined differential threshold THD1 and that an absolute value of corrected value S89 is larger than a predetermined output threshold value TH1 are satisfied. AND processor 91 outputs a low-level (non-active level) signal if at least one of conditions that the absolute value of the time-differentiated value of detection value S74 is larger than the predetermined differential threshold THD1 and that the absolute value of corrected value S89 is not larger than the predetermined output threshold TH1 is satisfied. Abnormal-condition judgment section 92 outputs update command signal S92 once to updating buffer 79 when AND processor 91 continues outputting the high-level (active level) signal for a time not shorter than a predetermined abnormality duration time (5 sec according to Embodiment 3). After outputting update command signal S92, abnormal-condition judgment section 92 further outputs update command signal S92 to updating buffer 79 when AND processor 91 continue outputting the high-level (active level) signal for a time not shorter than the predetermined abnormality duration time (5 sec according to Embodiment 5). Receiving update command signal S92, updating buffer 79 replaces offset value S79 with delayed detection value S84 to update offset value S79 and store the updated offset value S79. Subtracter 89 subtracts offset value S79 from detection value S74 to provide corrected value S89. When a time-differentiated value of detection value S74 is not larger than the predetermined differential threshold THD1, detection value S74 changes little, so that delayed detection value S84 is substantially equal to detection value S74. As a result, when delay command signal S92 is received, offset value S79 is about equal to detection value S74, so that corrected value S89 can become substantially 0 (zero).

Figure 10:
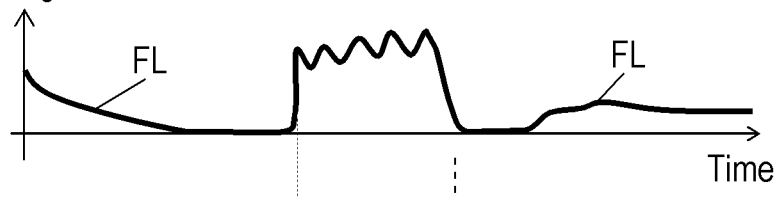
FIG. 10 shows signals of the physical quantity sensor in accordance with Embodiment 3.
Figure 10:
Figure 10:
Figure 10:
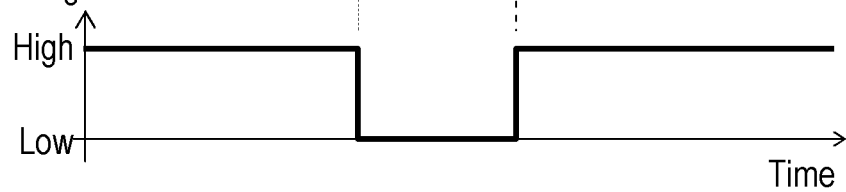

An operation of physical quantity sensor 2000 with a changing ambient temperature of physical quantity sensor 2000 will be described below. FIG. 10 shows detection value S74 output from digital filter 74 (detection circuit 73), output signal S77 from differential judgment section 77, corrected value S89, and output signal S80 from window comparator 80. In FIG. 10, the horizontal axes represent time. A change in the ambient temperature of physical quantity sensor 2000 changes detection value S74 output from digital filter 74 (detection circuit 73). Fluctuation FL having a low frequency appears on detection value S74. An absolute value of a time-differentiated value of fluctuation FL is not larger than a predetermined differential threshold THD1 (800 deg/sec$^2$ according to Embodiment 3) of differential judgment section 77.

While fluctuation FL appears, since the absolute value of the time-differentiated value of detection value S74 is not larger than the predetermined differential threshold THD1, differential judgment section 77 outputs signal S77 having a high level. A condition that an absolute value of corrected value S89 is larger than a predetermined output threshold TH1 (2 deg/sec according to Embodiment 3) may continue to be satisfied for a time not shorter than a predetermined abnormality duration time (5 sec according to Embodiment 3). In particular, if all of conditions that the absolute value of the time-differentiated value of detection values 74 determined by differential judgment section 77 is not larger than the predetermined differential threshold THD 1 and that the absolute value of corrected value S89 determined by window comparator 80 is larger than the predetermined output threshold TH1 continue to be satisfied for a time not shorter than the predetermined abnormality duration time (5 sec according to Embodiment 3), the sensor is abnormal. In physical quantity sensor 2000 in accordance with Embodiment 3, a signal output from differential judgment section 77 and a signal output from NOT processor 82 are supplied to AND processor 91. Abnormal-condition judgment section 92 outputs update command signal S92 to updating buffer 79 if AND processor 91 continue outputting high-level signals for a time not shorter than the predetermined abnormality duration time (5 sec in according to Embodiment 3). Receiving update command signal S92, updating buffer 79 determines offset value S79 to be delayed detection value S84 and retains it, thereby updating offset value S79 and outputting the updated offset value S79 to subtracter 89. Subtracter 89 then subtracts offset value S79 from detection value S74, thereby causing corrected value S89, particularly fluctuation FL, to be substantially 0 (zero), as shown in FIG. 10.

Updating buffer 79 replaces offset value S79 with detection value S74 instead of with delayed detection value S84 for updating the offset value.

Correction processor 175 may be implemented not only by hardware but also by software executed by a CPU.

As described above, correction processor 175 is configured to cause corrected value S89 to be substantially 0 (zero) if all of conditions that the absolute value of time-differentiated value of detection value S74 is not larger than the predetermined differential threshold THD1 and that the absolute value of corrected value S89 is larger than the predetermined output threshold TH1 continue to be satisfied for a time not shorter than the predetermined abnormality duration.

Correction processor 175 may be configured to store offset value S79, and replace offset value S79 with detection value S74 (delayed detection value S84) to update offset value S79 if all of conditions that the absolute value of time-differentiated value of detection value S74 is not larger than the predetermined differential threshold THD1 and that the absolute value of corrected value S89 is larger than the predetermined output threshold TH1 continue to be satisfied for a time not shorter than the predetermined abnormality duration. In this case, correction processor 175 subtracts offset value S79 from detection value S74 to provide corrected value S89, thereby causing corrected value S89 to be substantially 0 (zero).

Similarly to physical quantity sensor 1001 in accordance with Embodiment 2, physical quantity sensor 2000 can detect angular velocities (physical quantities) about plural axes, such as two axes or three axes.

Exemplary Embodiment 4

Figure 11:
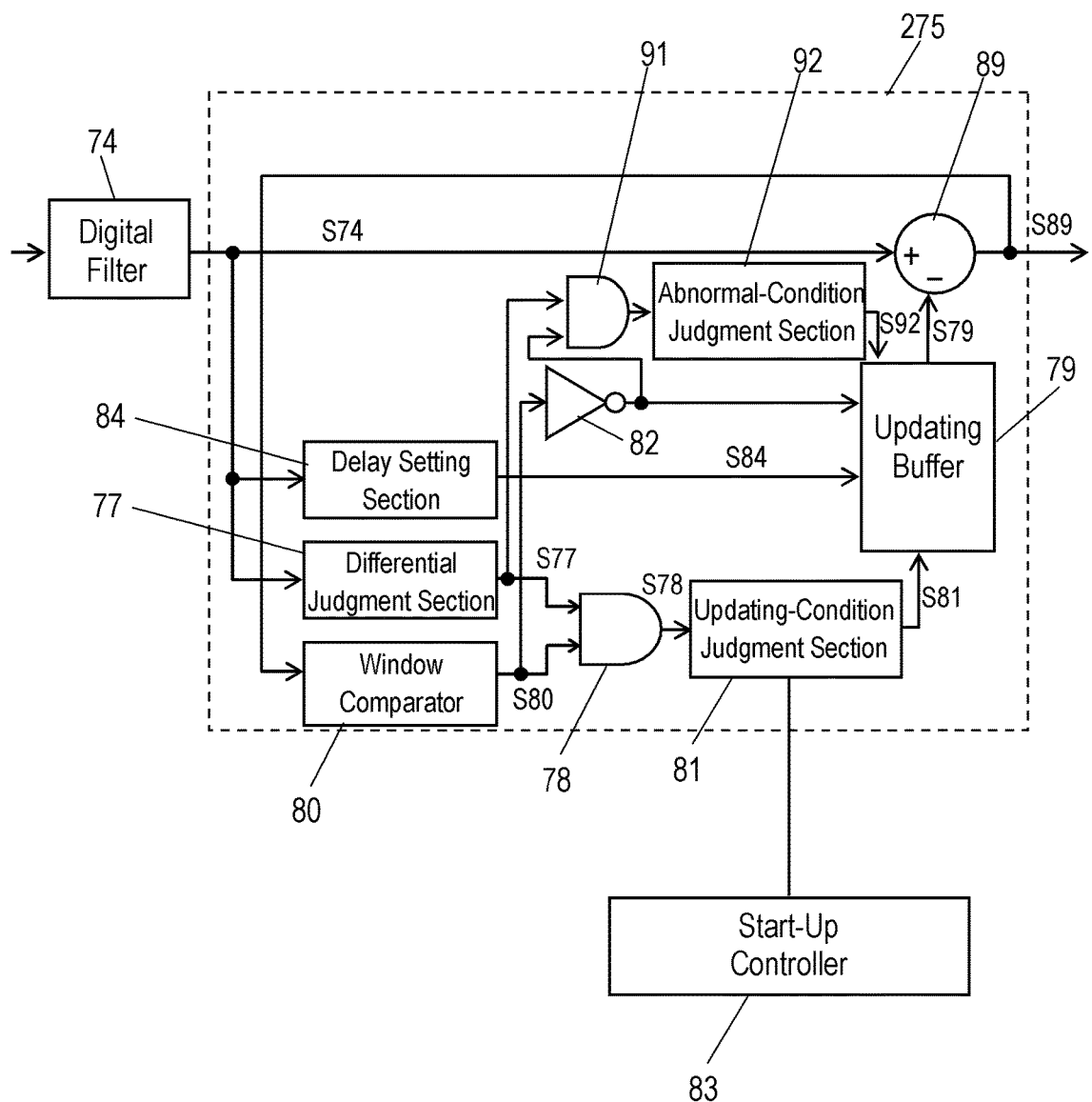
FIG. 11 is a circuit diagram of a correction processor of the physical quantity sensor in accordance with Exemplary Embodiment 4 of the present invention.
Figure 12:
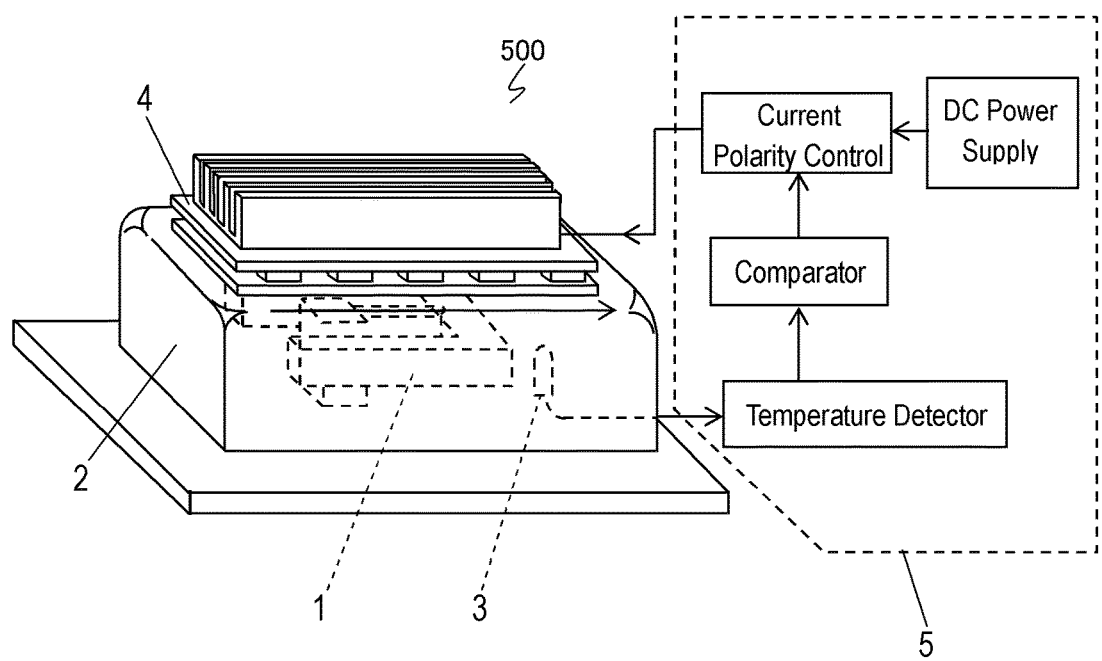
FIG. 12 is a perspective view of a conventional physical quantity sensor.

FIG. 11 is a circuit diagram of correction processor 275 of a physical quantity sensor in accordance with Embodiment 4. In FIG. 11, components identical to those of correction processor 75 of physical quantity sensor 1000 in accordance with Embodiment 1 shown in FIGS. 1-4 and correction processor 175 of physical quantity sensor 2000 in accordance with Embodiment 4 shown in FIGS. 8 and 9 are denoted by the same reference numerals.

Correction processor 275 in accordance with Embodiment 4 further includes AND processor 91 and abnormal-condition judgment section 92 according to Embodiment 3 in addition to correction processor 75 of Embodiment 1. Updating-condition judgment section 81 outputs update command signal S81 once when AND processor 78 continues outputting a high-level (active level) signal for a time not shorter than a predetermined drift duration (0.5 sec according to Embodiment 4). Even after outputting update command signal S81, if AND processor 78 still continues outputting the high-level (active level) signal for a time not shorter than the predetermined drift duration (0.5 sec), updating-condition judgment section 81 further outputs update command signal S81. Abnormal-condition judgment section 92 outputs update command signal S92 once time when AND processor 91 continues outputting a high-level (active level) signal for a time not shorter than a predetermined abnormality duration time (5 sec according to Embodiment 4). Even after outputting update command signal S92, if AND processor 91 still continues outputting the high-level (active level) signal for a time not shorter than the predetermined abnormality duration time (5 sec), abnormal-condition judgment section 92 further outputs update command signal S92. Receiving update command signal S81 or update command signal S92, updating buffer 79 replaces offset value S79 with delayed detection value S84, thereby updating offset value S79 and storing the updated offset value S79. Subtracter 89 subtracts offset value S79 from detection value S74 to provide corrected value S89, and outputs corrected value S89.

In other words, updating buffer 79 replaces offset value S79 with delayed detection value S84, thereby updating offset value S79 and storing the updated offset value S79 if all of conditions that an absolute value of a time-differentiated value of detection value S74 is not larger than a predetermined differential threshold THD1 and that an absolute value of corrected value S89 is not larger than a predetermined output threshold TH1 continue to be satisfied for a time not shorter than a predetermined drift duration. Updating buffer 79 replaces offset value S79 with delayed detection value S84, thereby updating offset value S79 and storing updated offset value S79 if all of conditions that the absolute value of the time-differentiated value of detection value S74 is not larger than the predetermined differential threshold THD1 and that the absolute value of corrected value S89 is not larger than the predetermined output threshold TH1 continue to be satisfied for a time not shorter than a predetermined abnormality duration time (5 sec according to Embodiment 4).

In cases other than above, updating buffer 79 does not update offset value S79 to maintain and store offset value S79. Subtracter 89 subtracts offset value S79 from detection value S74 to provide corrected value S89, and outputs corrected value S89. The physical quantity sensor in accordance with Embodiment 4 can reduce a moderate and small change, such as a temperature drift, and reduce a change due to abnormality, thereby obtaining corrected value S89 indicating a physical quantity applied to detecting element 30 (FIG. 1).

If corrected value 89S is larger than the predetermined output threshold TH1, NOT processor 82 outputs a high-level (active level) signal, and updating buffer 79 does not update offset value S79 but maintains and stores offset value S79. However, receiving update-command signal S92 from abnormal-condition judgment section 92, updating buffer 79 provides update-command signal S92 with priority against the signal output from NOT processor 82, in other words, regardless of the signal output from NOT processor 82, updating buffer 79 replaces offset value S79 with delayed detection value S84 to update offset value S79, and stored the updated offset value S79.

Correction processor 275 may be implemented not only by hardware but also by software that is executed by a CPU.

Similar to physical quantity sensor 1001 in accordance with Embodiment 2, the physical quantity sensor in accordance with Embodiment 4 can detect angular velocities (physical quantities) about plural multiple axes, such as two axes or three axes.

INDUSTRIAL APPLICABILITY

A physical quantity sensor according to the present invention prevents a signal output from changing due to a temperature change, and is useful as a physical quantity sensor to be used for an attitude control of movable bodies, such as airplanes and vehicles, or used in navigation systems for the movable bodies.

REFERENCE MRKS IN THE DRAWINGS 30 detecting element
73 detection circuit
75 correction processor
77 differential judgment section
78 AND processor
80 window comparator
81 update condition judgment section
83 start-up controller
84 delay setting section
89, 89X, 89Y, 89Z subtracter
92 abnormal condition judgment section
99a circuit (first circuit)
99b circuit (second circuit)
99c circuit (third circuit)
99d circuit (fourth circuit)
101 detecting element
105 detection circuit
108 differential judgment section
110 window comparator
112 detection circuit
113 differential judgment section
114 window comparator
115 detection circuit
116 differential judgment section
117 window comparator
120X, 120Y, 120Z updating buffer
173 detection circuit
175 correction processor
275 correction processor
AX angular velocity (first physical quantity)
AY angular velocity (second physical quantity)
AZ angular velocity (third physical quantity)

The invention claimed is:
1. A physical quantity sensor comprising:
a detection circuit;
a first circuit that has a first output signal input thereto from the detection circuit; and a second circuit that has the first output signal input thereto from the detection circuit and has a second output signal input thereto from the first circuit, wherein the second circuit outputs a third output signal to the first circuit, wherein the first circuit includes a third circuit and a fourth circuit, wherein the first output signal is input to the third circuit, and the third output signal is input to the fourth circuit, and wherein the detection circuit outputs a signal supplied from a sensor configured to have a physical quantity applied thereto.

2. The physical quantity sensor according to claim 1, wherein the second circuit includes a subtracter.

3. The physical quantity sensor according to claim 2, wherein the third circuit includes a differential judgment section, wherein the fourth circuit includes a window comparator, wherein the first circuit further includes an AND processor and an updating buffer, wherein an output from the differential judgment section and an output from the window comparator are input to the AND processor, wherein an output signal from the AND processor is input to the updating buffer, and wherein an output from the updating buffer is input to the second circuit.

4. The physical quantity sensor according to claim 1, wherein the third circuit includes a differential judgment section, wherein the fourth circuit includes a window comparator, and wherein the physical quantity sensor is configured to cause the first output signal from the detection circuit to be substantially 0 (zero) if an output signal from the differential judgment section is within a first predetermined range and the third output signal input to the window comparator is within a second predetermined range.

5. A physical quantity sensor comprising:

a detection circuit;

a first circuit that has a first output signal input thereto from the detection circuit; and a second circuit that has the first output signal input thereto from the detection circuit and has a second output signal input thereto from the first circuit, wherein the second circuit outputs a third output signal to the first circuit, wherein the first circuit includes a third circuit and a fourth circuit, wherein the first output signal is input to the third circuit, and the third output signal is input to the fourth circuit, and wherein the second circuit includes a subtracter.

6. The physical quantity sensor according to claim 5, wherein the third circuit includes a differential judgment section, wherein the fourth circuit includes a window comparator, wherein the first circuit further includes an AND processor and an updating buffer, wherein an output from the differential judgment section and an output from the window comparator are input to the AND processor, wherein an output signal from the AND processor is input to the updating buffer, and wherein an output from the updating buffer is input to the second circuit.

7. The physical quantity sensor according to claim 5, wherein the third circuit includes a differential judgment section, wherein the fourth circuit includes a window comparator, and wherein the physical quantity sensor is configured to cause the first output signal from the detection circuit to be substantially 0 (zero) if an output signal from the differential judgment section is within a first predetermined range and the third output signal input to the window comparator is within a second predetermined range.

8. A physical quantity sensor comprising:

a detection circuit;

a first circuit that has a first output signal input thereto from the detection circuit; and a second circuit that has the first output signal input thereto from the detection circuit and has a second output signal input thereto from the first circuit, wherein the second circuit outputs a third output signal to the first circuit, wherein the first circuit includes a third circuit and a fourth circuit, wherein the first output signal is input to the third circuit, and the third output signal is input to the fourth circuit, wherein the third circuit includes a differential judgment section, wherein the fourth circuit includes a window comparator, and wherein the physical quantity sensor is configured to cause the first output signal from the detection circuit to be substantially 0 (zero) if an output signal from the differential judgment section is within a first predetermined range and the third output signal input to the window comparator is within a second predetermined range.

* * * * *